(12) United States Patent
Holfeld et al.

(10) Patent No.: US 10,841,943 B2
(45) Date of Patent: Nov. 17, 2020

(54) SCHEDULING ENHANCEMENTS FOR LATENCY-CONSTRAINED AND RELIABLE WIRELESS COMMUNICATION SYSTEMS

(71) Applicant: Fraunhofer-Gesellschaft zur Foerderung der angewandten Forschung e.V., Munich (DE)

(72) Inventors: Bernd Holfeld, Berlin (DE); Dennis Wieruch, Berlin (DE); Thomas Wirth, Kleinmachnow (DE); Thomas Fehrenbach, Berlin (DE); Cornelius Hellge, Berlin (DE); Yago Sánchez de la Fuente, Berlin (DE); Thomas Schierl, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/271,502

(22) Filed: Feb. 8, 2019

(65) Prior Publication Data

US 2019/0327760 A1    Oct. 24, 2019

Related U.S. Application Data

(63) Continuation of application No. PCT/EP2017/070444, filed on Aug. 11, 2017.

(30) Foreign Application Priority Data

Aug. 11, 2016   (EP) .................................. 16183900

(51) Int. Cl.
*H04L 12/50* (2006.01)
*H04W 72/12* (2009.01)
(Continued)

(52) U.S. Cl.
CPC ... *H04W 72/1289* (2013.01); *H04W 72/0446* (2013.01); *H04L 1/1812* (2013.01); *H04L 5/0055* (2013.01)

(58) Field of Classification Search
CPC ....................................................... H04L 12/28
(Continued)

(56) References Cited

U.S. PATENT DOCUMENTS

2005/0163235 A1   7/2005  Mo et al.
2009/0257408 A1   10/2009  Terry et al.
(Continued)

FOREIGN PATENT DOCUMENTS

JP   2007520158 A   7/2007
JP   2012512570 A   5/2012
(Continued)

OTHER PUBLICATIONS

"3GPP TS", 36.331 V13.1.0, Mar. 2016, p. 354.
(Continued)

*Primary Examiner* — Dang T Ton
(74) *Attorney, Agent, or Firm* — Perkins Coie LLP; Michael A. Glenn

(57) ABSTRACT

An apparatus for a wireless communication system, is configured to perform semi-persistent scheduling (SPS), wherein a size of an SPS interval is based on one or more transmission time intervals (TTIs). A further apparatus for a wireless communication system is described, wherein the apparatus is configured to perform semi-persistent scheduling, and wherein the apparatus is configured such that the semi-persistent scheduling is controlled via a configuration message.

20 Claims, 25 Drawing Sheets

(51) Int. Cl.
*H04W 72/04* (2009.01)
*H04L 1/18* (2006.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2010/0067457 | A1 | 3/2010 | Wang et al. |
| 2010/0067468 | A1 | 3/2010 | Ho et al. |
| 2010/0150091 | A1 | 6/2010 | Yu et al. |
| 2010/0169732 | A1 | 7/2010 | Wu |
| 2012/0082210 | A1 | 4/2012 | Chien et al. |
| 2012/0309402 | A1 | 12/2012 | Cheng et al. |
| 2014/0092829 | A1 | 4/2014 | Han et al. |
| 2019/0306923 | A1* | 10/2019 | Xiong .................. H04L 27/261 |

FOREIGN PATENT DOCUMENTS

| | | |
|---|---|---|
| JP | 2013543316 A | 11/2013 |
| JP | 2015532822 A | 11/2015 |
| KR | 20110105801 A | 9/2011 |
| RU | 2527749 C2 | 9/2014 |
| TW | M368260 U | 11/2009 |
| TW | 201004209 A | 1/2010 |
| TW | 201019644 A | 5/2010 |
| TW | 201025916 A | 7/2010 |
| WO | 2010075042 A2 | 7/2010 |

OTHER PUBLICATIONS

"3rd Generation Partnership Project; Technical Specification Group", 36.881 V0.6.0, Study on latency reduction techniques for LTE, Feb. 2016.

"3rd Generation Partnership Project; Technical Specification Group", V13.1.0, Mar. 2016, p. 42.

"3rd Generation Partnership Project; Technical Specification Group", 36.211 V13.1.0, Mar. 2016, Section 5.3.4.

"3rd Generation Partnership Project; Technical Specification Group", 36.211 V13.1.0, Mar. 2016, Section 6.4.1.

"3rd Generation Partnership Project; Technical Specification Group", 36.213 V13.1.1, Mar. 2016, Section 8.4.

"3rd Generation Partnership Project; Technical Specification Group", 36.213 V 13.1.1, Mar. 2016, Section 9.2.

"How LTE Stuff Works", Semi-Persistent Scheduling, http://howltestuffworks.blogspot.de/2013/semi-persistent-scheduling.html, Oct. 6, 2013.

3rd Generation Partnership Proje, "Technical Specification Group Radio Access Network, Evolved Universal Terrestrial Radio Access (E-UTRA); Study on latency reduction techniques for LTE (Release 14)", , 3GPP Draft; 36881-E00, 3rd Generation Partnership Project (3GPP), Mobile Competence Centre; 650, Route Des Lucioles; F-06921 Sophia-Antipolis Cedex; France, Jun. 2016.

Ericsson, "R1-165571—Way forward on scheduling mechanism for sTTI", May 2016.

Huawei, et al., "DCI design for short TTI", 3GPP Draft: R1-164060, 3rd Generation Partnership Project (3GPP), Mobile Competence Centre: 650, Route Des Lucioles; F-06921 Sophia-Antipolis Cedex, France, May 2016.

Intel Corporation, "Further aspects of fast uplink access solutions", 3GPP Draft: R2-154386 Further Aspects of Fast Uplink Access Solutions, 3rd Generation Partnership Project (3GPP), Mobile Competence Centre; 650, Route De Lucioles; F-06921 Sophia-Antipolis Cedex, Oct. 2015.

Johnson, C., "Long Term Evolution in Bullets", 2nd edition, 2012, p. 462.

R1-162588, "DCI design for short TTI", Huawei, HiSilicon, Apr. 2016.

R1-164060, "DCI design for short TTI", Huawei, HiSilicon, May 2016.

3rd Generation Partnership Project, "Technical Specification Group Radio Access Network; Evolved Universal Terrestrial Radio Access (E-UTRA); Medium Access Control (MAC) protocol specification (Release 13)", 3GPP TS 36.321 V13.1.0 (Mar. 2016), 650 Route des Lucioles—Sophia Antipolis Valbonne—France, The present p. 42ff., 2016, 85 pp.

"NTT DOCOMO, Inc.", (E) PDCCH for sidelink SPS configuration switching, 3GPP, TSG-RAN WG1#85 R1-165193, May 14, 2016, pp. 1-5.

Nokia Corporation, et al., "Indication of persistent allocation for UL", 3GPP Draft; R2-082304, 3rd Generation Partnership Project.

* cited by examiner

```
-- ASN1START

SPS-Config ::=    SEQUENCE {
    semiPersistSchedC-RNTI          C-RNTI              OPTIONAL,       -- Need OR
    sps-ConfigDL                    SPS-ConfigDL        OPTIONAL,       -- Need ON
    sps-ConfigUL                    SPS-ConfigUL        OPTIONAL        -- Need ON
}
SPS-ConfigDL ::=   CHOICE {
    release                         NULL,
    setup                           SEQUENCE {
        semiPersistSchedIntervalDL          ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        numberOfConfSPS-Processes           INTEGER (1..8),
        n1PUCCH-AN-PersistentList           N1PUCCH-AN-PersistentList,
        ...,
        [[ twoAntennaPortActivated-r10      CHOICE {
                release                         NULL,
                setup                           SEQUENCE {
                    n1PUCCH-AN-PersistentListP1-r10     N1PUCCH-AN-PersistentList
                }
            }                                                           OPTIONAL   -- Need ON
        ]]
    }
}
SPS-ConfigUL ::=   CHOICE {
    release                         NULL,
    setup                           SEQUENCE {
        semiPersistSchedIntervalUL          ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        implicitReleaseAfter                ENUMERATED {e2, e3, e4, e8},
        p0-Persistent                       SEQUENCE {
            p0-NominalPUSCH-Persistent          INTEGER (-126..24),
            p0-UE-PUSCH-Persistent              INTEGER (-8..7),
        }                                                               OPTIONAL,  -- Need OP
        twoIntervalsConfig                  ENUMERATED {true}           OPTIONAL,  -- Cond TDD
        ...,
        [[ p0-PersistentSubframeSet2-r12    CHOICE {
                release                         NULL,
                setup                           SEQUENCE {
                    p0-NominalPUSCH-PersistentSubframeSet2-r12      INTEGER (-126..4),
                    p0-UE-PUSCH-PersistentSubframeSet2-r12          INTEGER (-8..7)
                }
            }                                                           OPTIONAL,  -- Need ON
        ]]
    }
}

N1PUCCH-AN-PersistentList ::=       SEQUENCE (SIZE (1..4)) OF INTEGER (0..2047)

-- ASN1STOP
```

Fig. 3

| legacy users | low latency users |
|---|---|
| semiPersistSchedIntervalDL ENUMERATED { sf10, sf20, sf32, sf40, sf64, sf80, sf128, sf160, sf320, sf640, spare6, spare5, spare4, spare3, spare2, spare1 },... | (Example 1): semiPersistSchedIntervalDL ENUMERATED { stti10, stti20, stti32, stti40, stti64, stti80, stti128, stti160, stti320, stti640, stti_spare6, stti_spare5, stti_spare4, stti_spare3, stti_spare2, stti_spare1 },... |
| similar for semiPersistSchedIntervalUL | (Example 2): semiPersistSchedIntervalDL ENUMERATED { stti10, stti20, stti32, stti40, stti64, stti80, stti128, stti160, stti320, stti640, sttiA, sttiB, sttiC, sttiD, sttiE, sttiF },... |
| | similar for semiPersistSchedIntervalUL |

Fig. 6

| legacy users | low latency users |
|---|---|
| semiPersistSchedIntervalDL ENUMERATED {<br>sf10, sf20, sf32, sf40, sf64, sf80,<br>sf128, sf160, sf320, sf640,<br>spare6, spare5, spare4, spare3, spare2,<br>spare1}, ...<br><br>similar for semiPersistSchedIntervalUL | (Example 1):<br>semiPersistSchedIntervalDL ENUMERATED {<br>stti_nonspare10, stti_nonspare9,<br>stti_nonspare8, stti_nonspare7,<br>stti_nonspare6, stti_nonspare5,<br>stti_nonspare4, stti_nonspare3,<br>stti_nonspare2, stti_nonspare1,<br>stti_spare6, stti_spare5, stti_spare4,<br>stti_spare3, stti_spare2, stti_spare1}, ...<br><br>(Example 2):<br>semiPersistSchedIntervalDL ENUMERATED {<br>stti_nonspare10, stti_nonspare9,<br>stti_nonspare8, stti_nonspare7,<br>stti_nonspare6, stti_nonspare5,<br>stti_nonspare4, stti_nonspare3,<br>stti_nonspare2, stti_nonspare1,<br>sttiA, sttiB, sttiC, sttiD, sttiE,<br>sttiF}, ...<br><br>similar for semiPersistSchedIntervalUL |

Fig. 7

| Enumerated List (here: current labeling) | SPS Interval | Legacy Users | Low Latency Users | | |
|---|---|---|---|---|---|
| | | Subframe basis | sTTI basis: 7 OFDM symbols | TTI basis: 4/3 OFDM symbols | TTI basis: 2 OFDM symbols |
| sf10 | 10 ms | 10 | 20 | 40 | 70 |
| sf20 | 20 ms | 20 | 40 | 80 | 140 |
| sf32 | 32 ms | 32 | 64 | 128 | 224 |
| sf40 | 40 ms | 40 | 80 | 160 | 280 |
| sf64 | 64 ms | 64 | 128 | 256 | 448 |
| sf80 | 80 ms | 80 | 160 | 320 | 560 |
| sf128 | 128 ms | 128 | 256 | 512 | 896 |
| sf160 | 160 ms | 160 | 320 | 640 | 1120 |
| sf320 | 320 ms | 320 | 640 | 1280 | 2240 |
| sf640 | 640 ms | 640 | 1280 | 2560 | 4480 |
| spare6 | 5 ms | 5 | 10 | 20 | 35 |
| spare5 | 2 ms | 2 | 4 | 8 | 14 |
| spare4 | 1 ms | 1 | 2 | 4 | 7 |
| spare3 | 1/2 ms | / | 1 | 2 | 4 |
| spare2 | 2/7 ms | / | / | 1 | 2 |
| spare1 | 1/7 ms | / | / | / | 1 |

Fig. 8

| Enumerated List (here: current labeling) | Legacy Users | Low Latency Users | | |
|---|---|---|---|---|
| | Subframe basis | sTTI basis: 7 OFDM symbols | TTI basis: 4/3 OFDM symbols | TTI basis: 2 OFDM symbols |
| sf10 | 10 (10 ms) | 1 (1/2 ms) | 2 (1/2 ms) | 1 (1/7 ms) |
| sf20 | 20 (20 ms) | 2 (1 ms) | 4 (1 ms) | 2 (2/7 ms) |
| sf32 | 32 (32 ms) | 4 (2 ms) | 5 (2 ms) | 4 (4/7 ms) |
| sf40 | 40 (40 ms) | 10 (5 ms) | 12 (3 ms) | 7 (1 ms) |
| sf64 | 64 (64 ms) | 20 (10 ms) | 16 (4 ms) | 14 (2 ms) |
| sf80 | 80 (80 ms) | 30 (15 ms) | 20 (5 ms) | 21 (3 ms) |
| sf128 | 128 (128 ms) | 40 (20 ms) | 40 (10 ms) | 28 (4 ms) |
| sf160 | 160 (160 ms) | 50 (25 ms) | 60 (15 ms) | 35 (5 ms) |
| sf320 | 320 (320 ms) | 100 (50 ms) | 80 (20 ms) | 70 (10 ms) |
| sf640 | 640 (640 ms) | 200 (100 ms) | 120 (30 ms) | 140 (20 ms) |
| spare6 | ... | ... | ... | ... |
| spare5 | ... | ... | ... | ... |
| spare4 | ... | ... | ... | ... |
| spare3 | ... | ... | ... | ... |
| spare2 | ... | ... | ... | ... |
| spare1 | ... | ... | ... | ... |

Fig. 9

```
SPS-ConfigDL ::= CHOICE{
    release     NULL,
    setup       SEQUENCE {
        semiPersistSchedIntervalDL      INTEGER (N bits),
        numberOfConfSPS-Processes       INTEGER (1..8),
        n1PUCCH-AN-PersistentList       N1PUCCH-AN-PersistentList,
        ...
    }
}
```

Fig. 10a

```
SPS-ConfigUL ::= CHOICE{
    release     NULL,
    setup       SEQUENCE {
        semiPersistSchedIntervalUL      INTEGER (N bits),
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        },
        twoIntervalsConfig              ENUMERATED {true}       OPTIONAL,    -- Need OP
        ...                                                      OPTIONAL,    -- Cond TDD
    }
}
```

Fig. 10b

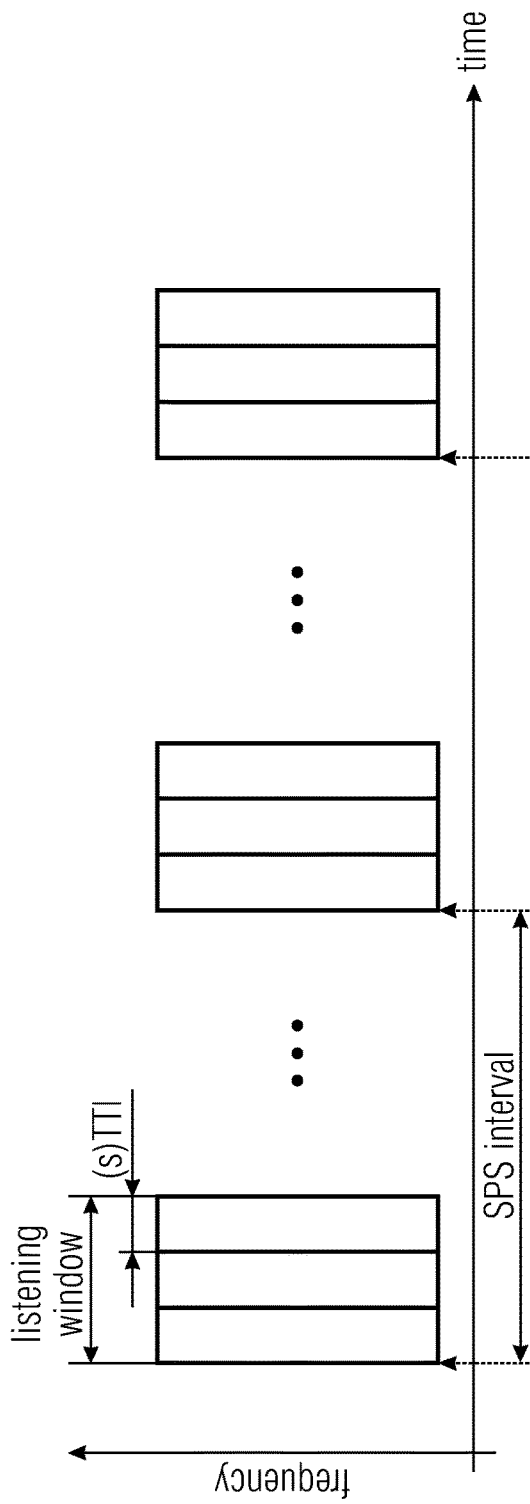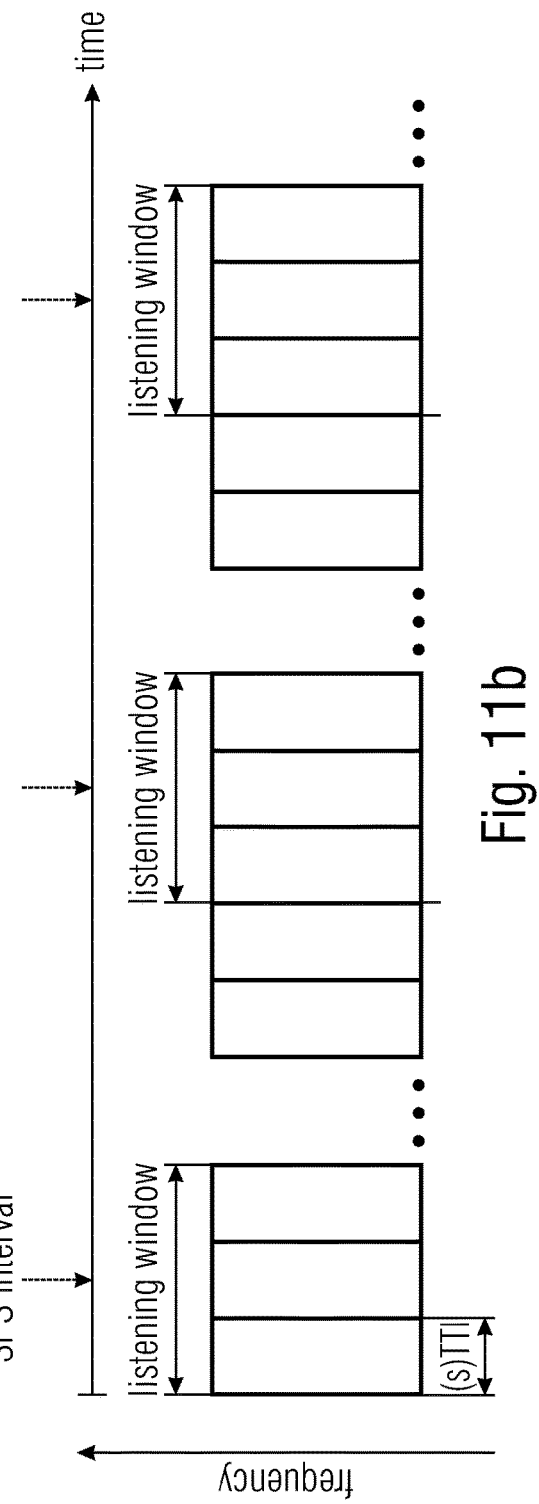

```
SPS-Config ::= SEQUENCE {
    semiPersistSchedC-RNTI C-RNTI         OPTIONAL,     -- Need OR
    sps-ConfigDL SPS-ConfigDL             OPTIONAL,     -- Need ON
    sps-ConfigUL SPS-ConfigUL             OPTIONAL      -- Need ON
    activationTime INTEGER (...)          OPTIONAL      -- Need ON
}

SPS-ConfigDL ::= CHOICE{
    release NULL,
    setup SEQUENCE {
        activationDelay INTEGER(...)         OPTIONAL      -- Need ON
        timeToLive INTEGER (...)             OPTIONAL      -- Need ON
        semiPersistSchedIntervalDL    ENUMERATED {
            sf10, sf20, sf32, sf40, sf64, sf80,
            sf128, sf160, sf320, sf640, spare6,
            spare5, spare4, spare3, spare2,
            spare1},
        numberOfConfSPS-Processes INTEGER (1..8),
        n1PUCCH-AN-PersistentList N1PUCCH-AN-PersistentList,
        ...,
        [[ twoAntennaPortActivated-r10 CHOICE {
            release NULL,
            setup SEQUENCE {
                n1PUCCH-AN-PersistentListP1-r10 N1PUCCH-AN-PersistentList
            }
        }                                    OPTIONAL     -- Need ON
        ]]
    }
}
SPS-ConfigUL ::= CHOICE {
    release NULL,
    setup SEQUENCE {
        activationDelay INTEGER(...)         OPTIONAL      -- Need ON
        timeToLive INTEGER (...)             OPTIONAL      -- Need ON
        semiPersistSchedIntervalUL    ENUMERATED {
            sf10, sf20, sf32, sf40, sf64, sf80,
            sf128, sf160, sf320, sf640, spare6,
            spare5, spare4, spare3, spare2,
            spare1},
        implicitReleaseAfter   ENUMERATED {e2, e3, e4, e8},
        p0-Persistent SEQUENCE {
            p0-NominalPUSCH-Persistent INTEGER (-126..24),
            p0-UE-PUSCH-Persistent INTEGER (-8..7)
        } OPTIONAL,         -- Need OP
        twoIntervalsConfig ENUMERATED {true} OPTIONAL,      -- Cond TDD
        ...,
        [[ p0-PersistentSubframeSet2-r12 CHOICE {
            release NULL,
            setup SEQUENCE {
                p0-NominalPUSCH-PersistentSubframeSet2-r12 INTEGER (-126..24),
                p0-UE-PUSCH-PersistentSubframeSet2-r12   INTEGER (-8..7)
            }
        } OPTIONAL      -- Need ON
        ]]
    }
}
```

Fig. 12

|  | eSPS-Config, provided by RRC | SPS-validated DCI, provided by PDCCH/sPDCCH |
|---|---|---|
| Prior art | no signaling of resource block assignment and/or other DCI information | signaling of resource block assignment, transmission modes, MCS settings and other transmission information |
| Example 1 | full signaling of resource block assignment, transmission modes, MCS settings and other transmission information (with or without pre-configured hopping pattern) as in SPS-validated DCI | absolutely no use of DCI in SPS operation |
| | | generally no use of DCI in SPS operation but permission of DCI messages to indicate instantaneous one-time hopping of resource blocks |
| Example 2 | only partial transfer of DCI information relevant to SPS operation by e.g. signaling of resource block assignment (with or without pre-configured hopping pattern) | reduced narrowband DCI in self-contained frame structure, i.e. DCI directly in front of the assigned resource blocks (in combination with sTTI's) and not spread over the PDCCH/sPDCCH => e.g. excellent for IoT devices or for saving battery power |

Fig. 13

| Format 0 - C-RNTI, SPS C-RNTI |||
|---|---|---|
| field name | length | comment |
| Flag for format0/format1A differentiation | 1 | |
| Hopping flag | 1 | |
| N_ULhop | 1 (1.4 Mhz)<br>1 (3 Mhz)<br>1 (5 Mhz)<br>2 (10 Mhz)<br>2 (15 Mhz)<br>2 (20 Mhz) | Applicable only when Hopping flag is set. (Refer to 36.213 Table 8.4-1 and Table 8.4-2)is. |
| Resource block assignment | 5 (1.4 Mhz)<br>7 (3 Mhz)<br>7 (5 Mhz)<br>11 (10 Mhz)<br>12 (15 Mhz)<br>13 (20 Mhz) | See 36.213 8.1 |
| MCS and RV | 5 | |
| NDI (New Data Indicator) | 1 | |
| TPC for PUSCH | 2 | See Power Control section |
| Cyclic shift for DM RS | 3 | See 36.211 Table Table 5.5.2.1.1-1 |
| UL index (TDD only) | 2 | This field is present only for TDD operation with uplink-downlink configuration 0 |
| Downlink Assignment Index (DAI) | 2 | Only for TDD Operation with uplink-downlink configurations 1-6 |
| CQI request (1 bit) | 1 | Refer to 36.213 Table 7.3-X |

Fig. 14

```
SPS-ConfigUL ::= CHOICE{
    release                          NULL,
    setup SEQUENCE {
        semiPersistSchedIntervalUL   ENUMERATED {sf10, sf20, sf32, sf40, sf64, sf80,
                                                 sf128, sf160, sf320, sf640, spare6,
                                                 spare5, spare4, spare3, spare2,
                                                 spare1},
        Hopping flag                 BOOLEAN,
        N_ULhop                      BIT STRING (...),
        RB assignment                INTEGER (5-13 bits),
        MCS and RV                   INTEGER (5 bits),
        implicitReleaseAfter         ENUMERATED {e2, e3, e4, e8},
        p0-Persistent                SEQUENCE {
            p0-NominalPUSCH-Persistent   INTEGER (-126..24),
            p0-UE-PUSCH-Persistent       INTEGER (-8..7)
        }                                                           OPTIONAL,    -- Need OP
        twoIntervalsConfig           ENUMERATED {true}              OPTIONAL,    -- Cond TDD
        ...
    }
}
```

Fig. 15

Figure 1 automatically triggered SPS switch between low lat and legacy operation and analysis-based triggered SPS switch between legacy and low lat operation

| legacy users | low latency users |
|---|---|
| SPS-ConfigDL ::= CHOICE{<br>    release NULL,<br>    setup SEQUENCE {<br>        ...<br>    }<br>}<br><br>similar for SPS-ConfigUL | SPS-ConfigDL ::= CHOICE{<br>    release NULL,<br>    setup SEQUENCE {<br>        ...<br>        TTL INTEGER (..) OPTIONAL<br>    }<br>}<br><br>similar for SPS-ConfigUL |

Fig. 19a

| legacy users | low latency users |
|---|---|
| SPS-ConfigDL ::= CHOICE{<br>    release NULL,<br>    setup SEQUENCE {<br>        ...<br>    }<br>}<br><br>similar for SPS-ConfigUL | SPS-ConfigDL ::= CHOICE{<br>    release NULL,<br>    setup SEQUENCE {<br>        ...<br>        TTL ENUMERATED {ttl1, ttl2, ttl3, ttl4},<br>        OPTIONAL<br>    }<br>}<br><br>similar for SPS-ConfigUL |

Fig. 19b

| legacy users | low latency users |
|---|---|
| SPS-ConfigDL ::= CHOICE{<br>    release NULL,<br>    setup SEQUENCE {<br>        ...<br>    }<br>}<br><br>similar for SPS-ConfigUL | SPS-ConfigDL ::= CHOICE{<br>    release NULL,<br>    setup SEQUENCE {<br>        ...<br>        TTL INTEGER (..) OPTIONAL<br>    }<br>}<br><br>similar for SPS-ConfigUL |

Fig. 20a

| legacy users | low latency users |
|---|---|
| SPS-ConfigDL ::= CHOICE{<br>    release NULL,<br>    setup SEQUENCE {<br>        ...<br>    }<br>}<br><br>similar for SPS-ConfigUL | SPS-ConfigDL ::= CHOICE{<br>    release NULL,<br>    setup SEQUENCE {<br>        ...<br>        TTL ENUMERATED {tts1, tts2, tts3, tts4} OPTIONAL<br>    }<br>}<br><br>similar for SPS-ConfigUL |

Fig. 20b

```
SPS-ConfigDL ::= CHOICE{
  release NULL,
  setup SEQUENCE {
    ...
    sps-ConfigDL          SPS-ConfigDL          OPTIONAL,          -- Need ON
  }
}
```

Fig. 23

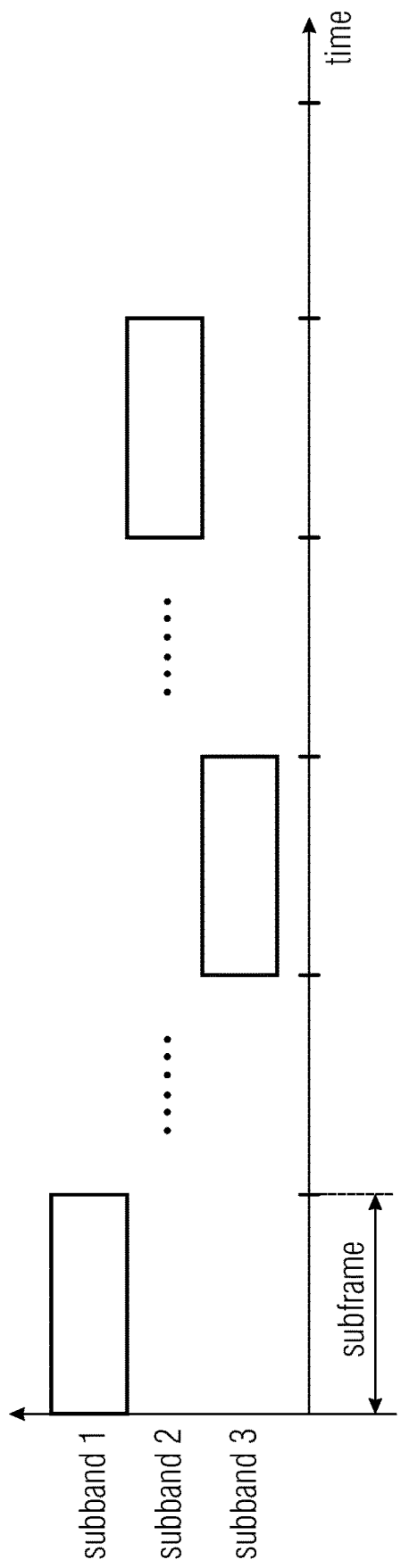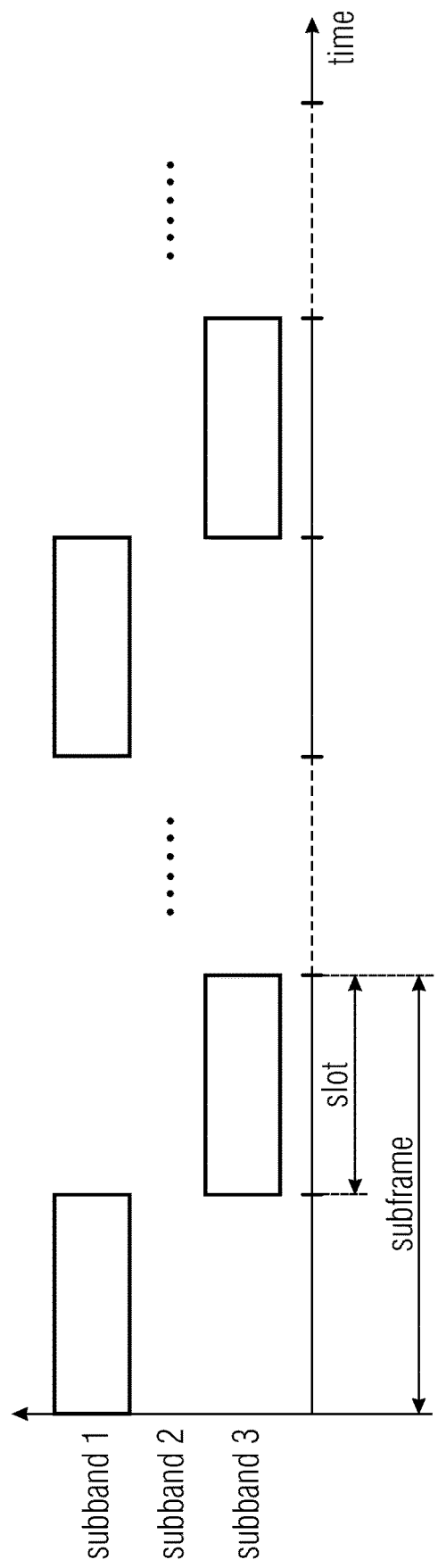

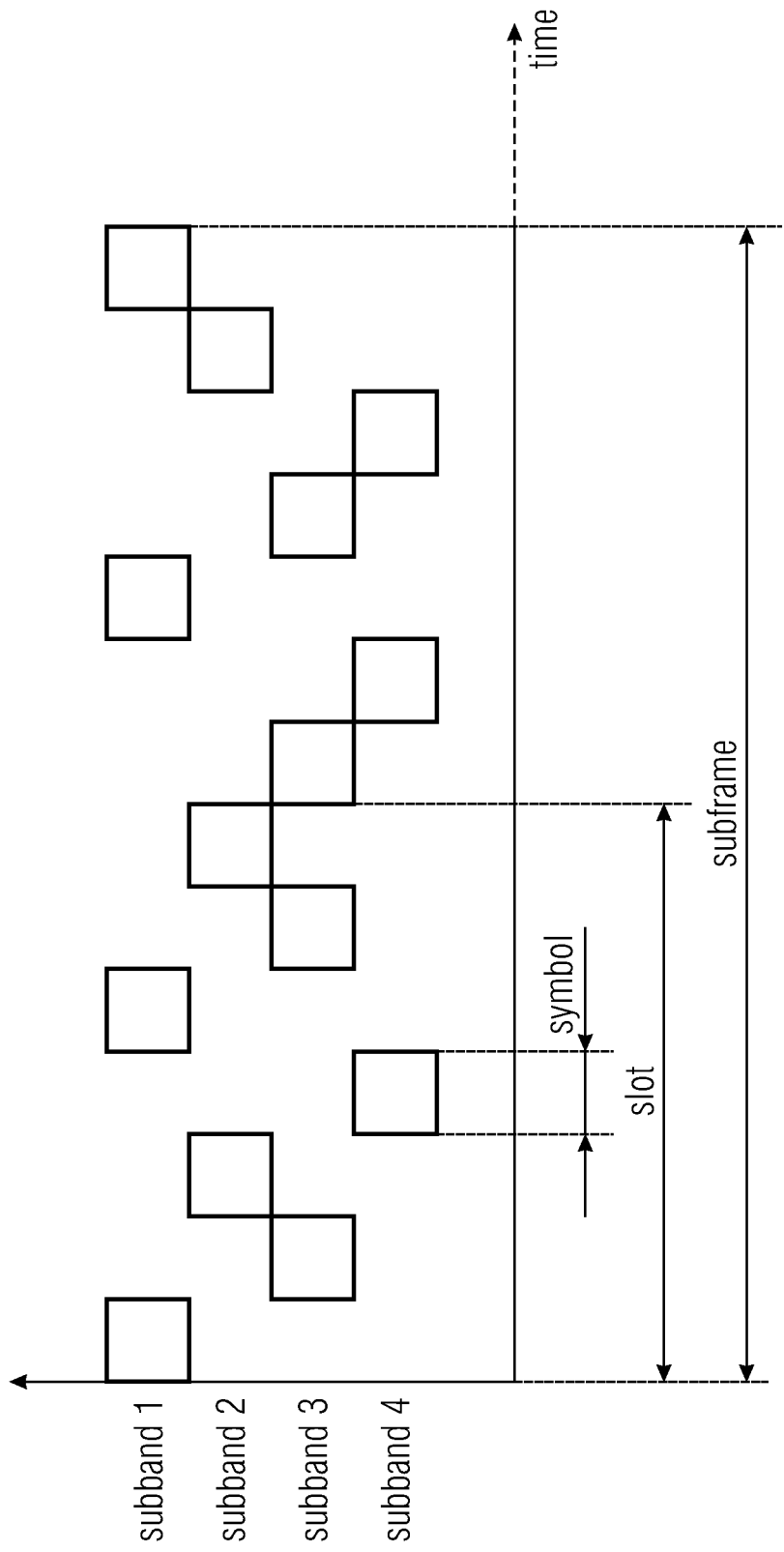

SCHEDULING ENHANCEMENTS FOR LATENCY-CONSTRAINED AND RELIABLE WIRELESS COMMUNICATION SYSTEMS

CROSS-REFERENCES TO RELATED APPLICATIONS

This application is a continuation of copending International Application No. PCT/EP2017/070444, filed Aug. 11, 2017, which is incorporated herein by reference in its entirety, and additionally claims priority from European Applications No. EP 16 183 900.6, filed Aug. 11, 2016, which is incorporated herein by reference in its entirety.

BACKGROUND OF THE INVENTION

The present invention concerns the field of wireless communication systems, for example wireless mobile communication systems, in which data is transmitted between apparatuses of the wireless communication system, which may act as transmitters and receivers and may be base stations or mobile terminals.

FIG. 1 shows a schematic representation of an example of a wireless communication system including a plurality of base stations $eNB_1$ to $eNB_5$, each serving a specific area surrounding the base station schematically represented by the respective cells $100_1$ to $100_5$. The base stations are provided to serve mobile terminals that are present within a cell. FIG. 1 shows only five cells, however, the wireless communication system may include more such cells. FIG. 1 shows two mobile terminals $UE_1$ and $UE_2$ that are in cell $100_2$ and that are served by base station $eNB_2$. The arrows $102_1$, $102_2$ schematically represent uplink/downlink channels for transmitting data from a mobile terminal $UE_1$, $UE_2$ to the base stations $eNB_2$ or for transmitting data from the base station $eNB_2$ to the mobile terminal $UE_1$, $UE_2$, respectively. The wireless communication system may be an orthogonal frequency-division multiplexing (OFDM) system or an orthogonal frequency-division multiple access (OFDMA) system, as it is, for example, defined by the LTE standard or other multicarrier systems based on frequency-division multiplexing. In the current LTE standard, a transmission time interval (TTI) is defined as having a length of 1 millisecond, and the TTI is the granularity at which the data may be mapped from higher layers to the physical layer (PHY) to perform the transmission. The mobile terminal processes the data that it receives with a granularity of 1 millisecond. The mobile terminal needs to be synchronized to the radio network. Control information are send each millisecond and processed by the mobile terminal to see whether some data has been sent to it, and, in an affirmative case, the mobile terminal has to decode the data channel.

An OFDMA system for data transmission makes use of an OFDMA-based physical resource grid which comprises a set of resource elements to which various physical channels and physical signals are mapped. For example, in accordance with the LTE standard, the physical channels may include the physical downlink shared channel (PDSCH) carrying user specific data, also referred to as downlink payload data, the physical broadcast channel (PBCH) carrying for example the master information block, the physical downlink control channel (PDCCH) carrying for example the downlink control information (DCI), etc. The physical signals may comprise reference signals (RS), synchronization signals and the like. The LTE resource grid comprises a 10 milliseconds frame in the time domain having a given bandwidth in the frequency domain. The frame has 10 subframes of 1 millisecond length, and each subframe includes two slots of 6 or 7 OFDM symbols depending on the cyclic prefix (CP) length.

FIG. 2 shows an example of a LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. A resource element is made up of one symbol in the time domain and one subcarrier in the frequency domain. The white boxes 106 represent resource elements allocated to the PDSCH carrying the payload or user data, also referred to a payload region. The resource elements for the physical control channels (carrying non-payload or non-user data), also referred to the control region, are represented by the hatched boxes 108. In accordance with examples, resource elements 108 may be allocated to the PDCCH, to the physical control format indicator channel (PCFICH), and to the physical hybrid ARQ indicator channel (PHICH). The cross-hatched boxes 110 represent resource elements which are allocated to the RS that may be used for the channel estimation. The black boxes 112 represent unused resources in the current antenna port that may correspond to RSs in another antenna port.

The resource elements 108, 110, 112 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may carry symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1 the resource elements associated with symbols 8, 9, 10, 12 and 13 are all allocated to payload data, while for symbols 7 and 11 less resource elements are allocated to payload data.

The duration of the subframe is 1 millisecond, and in accordance with the LTE standard, the TTI is 1 millisecond. When transmitting data using the resource grid structure shown in FIG. 2, the receiver, for example the mobile terminal or mobile user, receives the resource elements depicted in FIG. 2 in 1 millisecond. The information contained or defined by the resource elements may be processed, and for each transmission, i.e., for each TTI having the 1 millisecond length, a constant number of payload data is received. The transmission scheme leads to an end-to-end latency of more than 1 millisecond, as the receiver first receives a transmission having a duration of 1 millisecond and then, once the transmission is completed, processes the control information to see whether some data has been sent to the receiver, and in case it is true, the receiver decodes the data channel of a length of 1 millisecond. Thus, the duration of the transmission and the processing time add up to a period exceeding 1 millisecond.

As explained above, the PDCCH is defined by a predefined number of OFDM symbols, i.e., there the size of the PDCCH is limited which, consequently, also limits how many DCIs may be carried in one subframe having a length of 1 millisecond. This may, in turn, limit the number of UEs which may receive an allocation for the subframe when using dynamic scheduling. To support more allocations, without increasing the size of the PDCCH, semi-persistent scheduling (SPS) may be used. When using SPS, the UE is pre-configured by the transmitter or base station with a SPS-RNTI (radio network temporary identifier), also be referred to as an allocation ID, and a periodicity. Once pre-configured, the UE may receive a further message defining an allocation for a downlink and/or uplink transmission of data on the basis of the associated SPS-RNTI. This allocation will repeat according to the pre-configured periodicity; in other words, once allocated, the resources may be repeatedly used for receiving/transmitting data by the UE without the need to perform scheduling in each subframe. In case the radio link conditions change, the base station may provide to the UE a resource allocation message for re-allocating resources. Currently, the SPS interval, i.e., the periodicity with which the transmission/reception of data on the certain allocated resources is performed, is defined on a subframe basis. Further, after pre-configuring the UE, additional messages need to be provided to the UE for SPS activation/release, for example by a DCI message sent in the PDCCH. Further, any control data for controlling an operation of a UE not directly associated with SPS needs to be transmitted by a DCI on the PDCCH.

SUMMARY

An embodiment may have an apparatus for a wireless communication system, wherein the apparatus is configured to perform semi-persistent scheduling (SPS), wherein a size of an SPS interval is based on one or more transmission time intervals (TTIs), wherein the apparatus is configured to receive and process a configuration message, the configuration message including one or more data fields indicative of the size of the SPS interval, wherein the configuration message indicates a listening window at the beginning of an SPS interval, the listening window having predefined size shorter than the size of the SPS interval, and wherein the apparatus is configured to listen for a control messages directed to the apparatus during the listening window.

Another embodiment may have an apparatus for a wireless communication system, wherein the apparatus is configured to perform semi-persistent scheduling (SPS), wherein a size of an SPS interval is based on one or more transmission time intervals (TTIs), wherein the apparatus is configured to receive and process a configuration message, the configuration message including one or more data fields indicative of the size of the SPS interval, and wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

Another embodiment may have an apparatus for a wireless communication system, wherein the apparatus is configured to perform semi-persistent scheduling, wherein the apparatus is configured such that the semi-persistent scheduling is controlled via a configuration message, and wherein the configuration message includes one or more of: control data activating, releasing or indicating a duration of the semi-persistent scheduling, control data indicating resources to be allocated for the semi-persistent scheduling, control data indicating transmission parameters for the semi-persistent scheduling, control data indicating frequency hopping information, control data indicating one or more certain downlink payload data messages triggering a direct or delayed uplink message, control data indicating several SPS intervals or SPS configuration modes among which one or more may be activated or deactivated by further configuration messages or control messages subsequent to the configuration message, control data indicating a listening window at the beginning of a SPS interval, the listening window having predefined size shorter than the size of the SPS interval and allowing for control messages during the listening window to be listened.

Another embodiment may have an apparatus for a wireless communication system, wherein the apparatus is configured to perform semi-persistent scheduling (SPS) for resources of first payload data transmissions in an SPS direction being a downlink or uplink direction, wherein the apparatus is configured so that SPS times at which the resources for the first payload data transmissions are scheduled, are triggered by second payload data transmissions in an opposite direction being opposite to the SPS direction.

Another embodiment may have an apparatus for a wireless communication system, wherein the apparatus is configured to perform semi-persistent scheduling (SPS), wherein the apparatus is configured so that a configuration mode of the SPS is changed, or SPS is established, triggered by a first entity communicating with another entity via payload data transmitted over the wireless communication system, or a message indicating an event which depends on physical environmental conditions of the apparatus.

Another embodiment may have a wireless communication system including an inventive apparatus.

According to another embodiment, a method may have the steps of: performing semi-persistent scheduling so as to receive or transmit data in a wireless communication system, wherein a size of an SPA interval is based on one or more transmission time intervals, wherein the method includes receiving and processing a configuration message, the configuration message including one or more data fields indicative of the size of the SPS interval, wherein the configuration message indicates a listening window at the beginning of an SPS interval, the listening window having predefined size shorter than the size of the SPS interval, and wherein the method includes listening for a control messages directed to an apparatus of the wireless communication system during the listening window.

According to another embodiment, a method may have the steps of: performing semi-persistent scheduling so as to receive or transmit data in a wireless communication system, controlling the semi-persistent scheduling via a configuration message, and wherein the configuration message includes one or more of: control data activating, releasing or indicating a duration of the semi-persistent scheduling, control data indicating resources to be allocated for the semi-persistent scheduling, control data indicating transmission parameters for the semi-persistent scheduling, control data indicating frequency hopping information, control data indicating one or more certain downlink payload data messages triggering a direct or delayed uplink message, control data indicating several SPS intervals or SPS configuration modes among which one or more may be activated or deactivated by further configuration messages or control messages subsequent to the configuration message, control data indicating a listening window at the beginning of a SPS interval, the listening window having predefined size shorter than the size of the SPS interval and allowing for control messages during the listening window to be listened.

According to another embodiment, a method may have the steps of: performing semi-persistent scheduling so as to receive or transmit data in a wireless communication system, wherein a size of an SPA interval is based on one or more transmission time intervals, wherein the method includes receiving and processing a configuration message, the configuration message including one or more data fields indicative of the size of the SPS interval, and wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

According to another embodiment, a method may have the steps of: performing semi-persistent scheduling (SPS) for resources of first payload data transmissions in a wireless communication system in an SPS direction being a downlink or uplink direction, triggering SPS times at which the resources for the first payload data transmissions are scheduled, by second payload data transmissions in an opposite direction being opposite to the SPS direction.

According to another embodiment, a method may have the steps of: performing semi-persistent scheduling (SPS) in a wireless communication system, changing a configuration of the SPS is changed, or establishing the SPS, triggered by a first entity communicating with another entity via payload data transmitted over the wireless communication system, or a message indicating an event which depends on physical environmental conditions.

Another embodiment may have a non-transitory digital storage medium having a computer program stored thereon to perform the method having the steps of: performing semi-persistent scheduling so as to receive or transmit data in a wireless communication system, wherein a size of an SPA interval is based on one or more transmission time intervals, wherein the method includes receiving and processing a configuration message, the configuration message including one or more data fields indicative of the size of the SPS interval, wherein the configuration message indicates a listening window at the beginning of an SPS interval, the listening window having predefined size shorter than the size of the SPS interval, and wherein the method includes listening for a control messages directed to an apparatus of the wireless communication system during the listening window, when said computer program is run by a computer.

Another embodiment may have a non-transitory digital storage medium having a computer program stored thereon to perform the method having the steps of: performing semi-persistent scheduling so as to receive or transmit data in a wireless communication system, controlling the semi-persistent scheduling via a configuration message, and wherein the configuration message includes one or more of: control data activating, releasing or indicating a duration of the semi-persistent scheduling, control data indicating resources to be allocated for the semi-persistent scheduling, control data indicating transmission parameters for the semi-persistent scheduling, control data indicating frequency hopping information, control data indicating one or more certain downlink payload data messages triggering a direct or delayed uplink message, control data indicating several SPS intervals or SPS configuration modes among which one or more may be activated or deactivated by further configuration messages or control messages subsequent to the configuration message, control data indicating a listening window at the beginning of a SPS interval, the listening window having predefined size shorter than the size of the SPS interval and allowing for control messages during the listening window to be listened, when said computer program is run by a computer.

Another embodiment may have a non-transitory digital storage medium having a computer program stored thereon to perform the method having the steps of: performing semi-persistent scheduling so as to receive or transmit data in a wireless communication system, wherein a size of an SPA interval is based on one or more transmission time intervals, wherein the method includes receiving and processing a configuration message, the configuration message including one or more data fields indicative of the size of the SPS interval, and wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message, when said computer program is run by a computer.

Another embodiment may have a non-transitory digital storage medium having a computer program stored thereon to perform the method having the steps of: performing semi-persistent scheduling (SPS) for resources of first payload data transmissions in a wireless communication system in an SPS direction being a downlink or uplink direction, triggering SPS times at which the resources for the first payload data transmissions are scheduled, by second payload data transmissions in an opposite direction being opposite to the SPS direction, when said computer program is run by a computer.

Another embodiment may have a non-transitory digital storage medium having a computer program stored thereon to perform the method having the steps of: performing semi-persistent scheduling (SPS) in a wireless communication system, changing a configuration of the SPS is changed, or establishing the SPS, triggered by a first entity communicating with another entity via payload data transmitted over the wireless communication system, or a message indicating an event which depends on physical environmental conditions, when said computer program is run by a computer.

BRIEF DESCRIPTION OF THE DRAWINGS

Embodiments of the present invention will be detailed subsequently referring to the appended drawings, in which:

FIG. 3 shows an example of a conventional SPS configuration;

FIG. 6 shows an example in which both the non-spare fields sfN and the spare fields spareX of the conventional SPS-Config message of FIG. 3 are relabeled;

FIG. 7 shows a table representing an embodiment in which the enumerated list of the conventional SPS scheduling intervals of the conventional SPS-Config message of FIG. 3 are relabeled on the basis of TTIs or sTTIs for latency-constrained users;

FIG. 8 shows a table representing an example for changing the SPS interval basis for low latency users to the sTTI but keeping the possibility of configuring the same SPS intervals as in the legacy mode;

FIG. 9 shows another example for a look-up table which may be used for keeping the SPS intervals in the legacy mode and changes the SPS intervals based on sTTI or TTI for low latency modes for any period that do not use the millisecond SPS interval periods as defined for legacy users;

FIG. 10a-b shows an embodiment for implementing SPS-ConfigDL and SPS-ConfigUL sections of an enhanced SPS configuration, wherein FIG. 10(a) shows the modified SPS-ConfigDL section, and FIG. 10(b) shows the modified SPS-ConfigUL section;

FIG. 11a,b show a schematic representation for implementing a listening window, with listening windows starting at the SPS interval beginning and starting slightly earlier in order to cross the leading end of the SPS interval;

FIG. 12 shows a representation of a SPS-Config message in accordance with an embodiment in which the activation/release of the SPS is signaled to the receiver together with the SPS-Config message;

FIG. 13 shows a table indicating examples of SPS-relevant DCI content that may be incorporated into the SPS-Config message in accordance with embodiments of the present invention;

FIG. 14 shows a DCI format zero, which is an uplink DCI format for PUSCH scheduling as it is used in conventional approaches;

FIG. 15 shows the SPS-Config UL with an example for the inventive SPS-Config message including the information highlighted in FIG. 14;

FIG. 16a-e shows embodiments for triggering SPS UL grants by DL messages, wherein FIG. 16(a) is a schematic representation of a direct UL grant, FIG. 16(b) is a schematic representation for a time-shifted UL grant, FIG. 16(c) is a schematic representation for direct/time-shifted UL grants with blanking, and FIG. 16(d) is a schematic representation of an embodiment in which a direct/time-shifted UL grant with keep-alive option after DL stop/interruption;

FIG. 19a-b shows examples for a modification of a SPS-Config message, wherein FIG. 19(a) shows a modified SPS-ConfigDL section indirectly signaling the time to live, and FIG. 19(b) shows a SPS-ConfigDL section the time to live field indirectly signaling the time to live;

FIG. 20a-b shows examples for a modification of a SPS-Config message, wherein FIG. 20(a) shows a modified SPS-ConfigDL section indirectly signaling the time to start, and FIG. 20(b) shows a SPS-ConfigDL section the time to live field indirectly signaling the time to start;

FIG. 23 shows an example for implementing a nested SPS-ConfigDL section in a SPS-Config message;

FIG. 26a-c shows for the case that a TTI is a sub-frame examples for inter-frequency hopping in LTE on sub-frame basis, intra-frequency hopping on slot-basis and, lastly, intra-frequency hopping for SPS on single OFDM-symbol basis or multiple OFDM-symbol (below-slot) basis, with the basis being possibly signallable by the SPS configuration.

DETAILED DESCRIPTION OF THE INVENTION

In the following, embodiments of the present invention are described in further detail with reference to the enclosed drawings in which elements having the same or similar function are referenced by the same reference signs.

Figure 1:
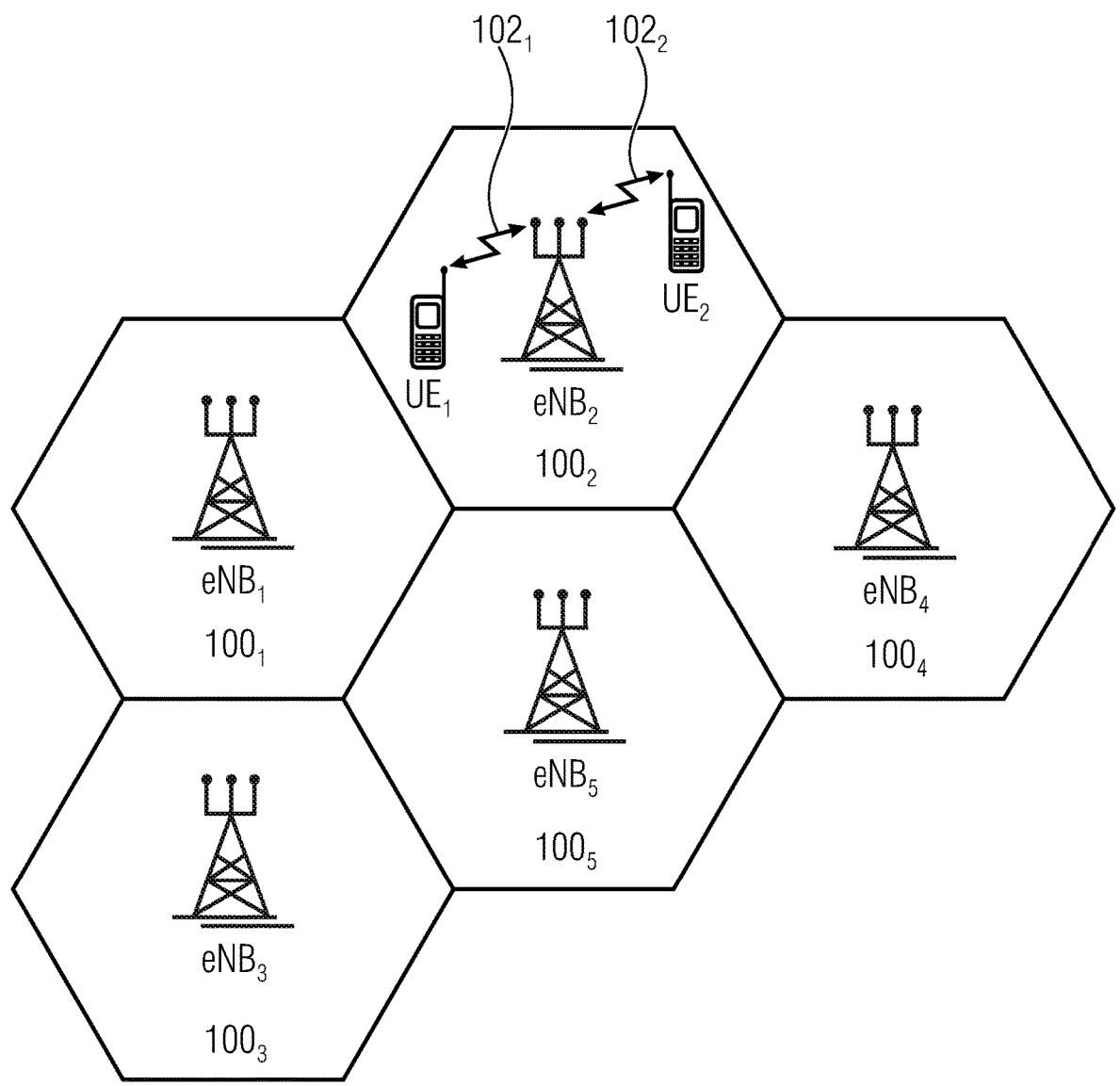
FIG. 1 shows a schematic representation of an example of a wireless communication system including a plurality of base stations.
Figure 2:
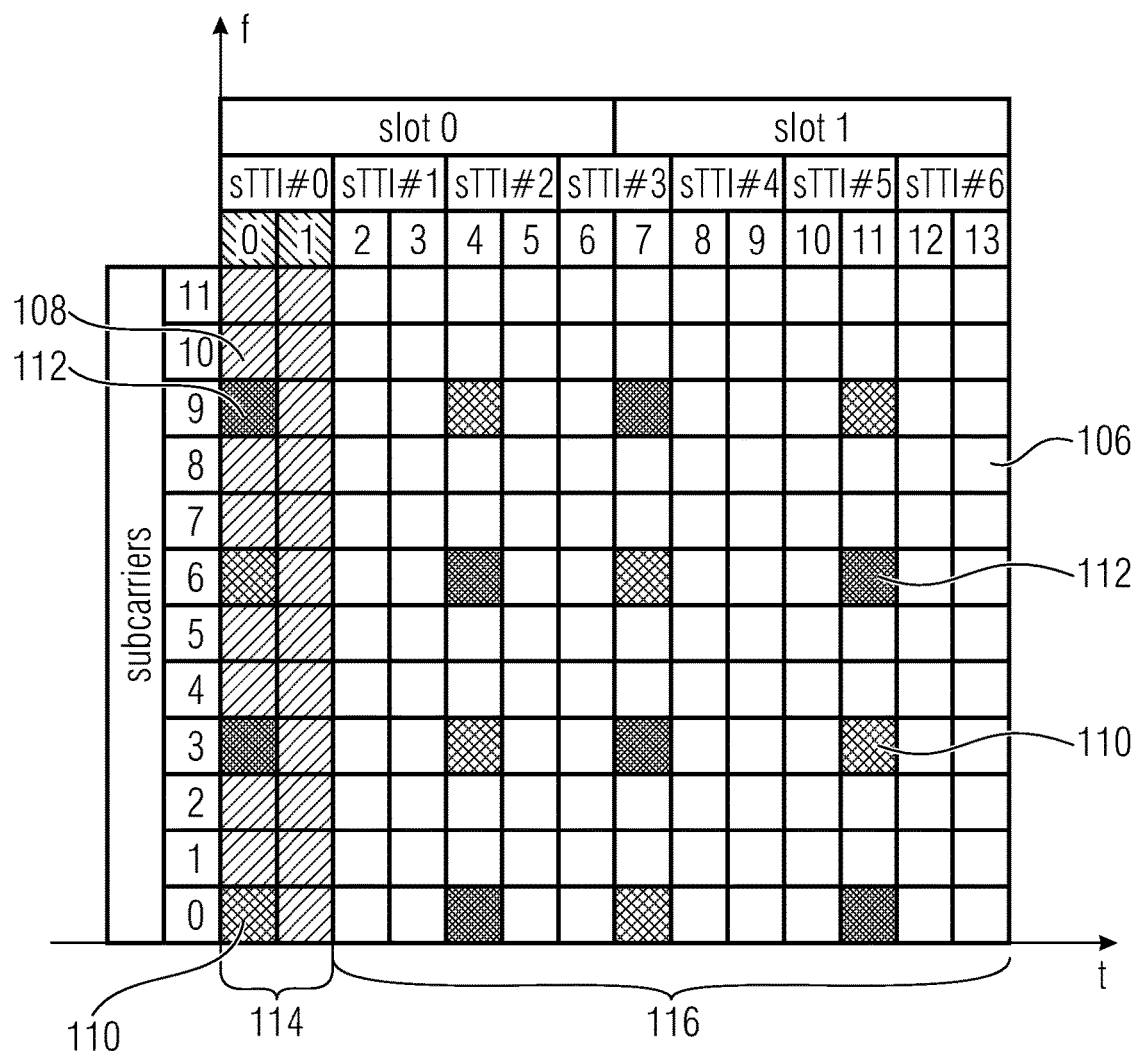
FIG. 2 shows an example of an OFDMA-subframe for two antennas ports as it may be used for a conventional LTE downlink communication.

A data transmission in a wireless communication system, like an OFDMA system as depicted in FIG. 1, may use a resource grid structure as shown in FIG. 2. The TTI, also referred to as transmission interval, is selected to be 1 millisecond which is the duration of the subframe, also referred to as data signal block. A receiver, like a mobile user, processes the data with a granularity of 1 millisecond, i.e., each millisecond the receiver synchronizes with the radio network and processes the control information. In case processing the control information shows that data is designated for the receiver, the data channel is decoded. There may be situations, for example extreme real-time communication use cases, like in machine-type communication, in vehicular communication or further ultra-low delay (ULD) services, where an end-to-end latency needs to be reduced to 1 millisecond or less. When the receiver processes the data with a granularity of 1 millisecond, such a reduction of the end-to-end latency is not achievable. A latency reduction to 1 millisecond or less may bring significant benefits in terms of throughput increase, for example in file transfer protocol (FTP)/transmission control protocol (TCP) transmissions in slow start mode and may also lead to a faster processing at the application layer. In the example of FIG. 2 the sub-frame has a sTTI length of two OFDM symbols.

In FIG. 2 the area defined by a plurality of the resource elements 106 of the OFDM symbols 0 and 1 is referred to as a control region 114 of the data signal block, and the remaining symbols 2 to 13 are referred to as a payload region 116. The control region 114 is used to transmit control data to the UE, for example in the PDCCH, the PCFICH and the PHICH. A number of resource elements in the control region is allocated to the PCFICH, and a number of resource elements is allocated to the PHICH. Further resource elements of the control region are allocated to the PDCCH. The PDCCH may carry control data for the uplink/downlink communication between the user equipment (UE) and the base station and for operating the UE. The control region may also transmit reference signals 110. Some resource elements may not be used, for example, resource elements 112. The control region 114 is also referred to as the control channel of the subframe.

As mentioned above, for improving the performance of UEs in a wireless communication system, as it is for example described with reference to FIG. 1, the semi-persistent scheduling (SPS) scheme may be applied. The SPS scheme is described, for example, in references [1] and [2]. SPS is a combination of persistent and dynamic scheduling. The persistent scheduling is used for the allocation of periodic resources intended for a transmission of transport blocks, and the dynamic scheduling is used for potentially needed incremental redundancy, i.e. hybrid automatic repeat request (HARQ) retransmissions. SPS allows for the reduction of control information overhead that originates, for example, from signaling the downlink (DL) and uplink (UL) resource allocation patterns at times where a connection needs to transfer data. SPS may be used both for the DL and UL of both FDD (frequency division duplexing) and TDD (time division duplexing). Reference [3] describes the initial configuration and the following activation/release of SPS. The base station may configure the UE to perform SPS at any time. Typically, this is done at the time of the dedicated bearer establishment for the service by RRC (radio resource control). The SPS may be configured/re-configured by RRC at any time using a configuration message that is also referred to as "SPS-Config". The SPS-Config message may include the SPS-RNTI as well as configuration information for the downlink and for the uplink. The configuration message does not allow a UE to start the SPS, rather, the base station serving the UE has to explicitly activate SPS so as to allow the UE to use SPS grants/assignments.

Once the UE has received the SPS-Config message including the SPS-RNTI associated with the UE, the UE may be configured by higher layers to decode the PDCCH with CRC (cyclic redundancy check) scrambled by the SPS-RNTI in every subframe, as the eNB may activate/release SPS at any time using a DCI message. A SPS activation/release message is validated by the UE as is explained in detail in reference [4].

After a valid activation, the UE decodes the PDCCH for CRC scrambled by the SPR-RNTI to check for SPS-validated DCI control information in every SPS subframe, i.e., in every subframe as defined by the SPS interval, the UE looks for information regarding possible changes, e.g. changes in the assigned resources, in the transmission mode, the MCS (modulation and coding scheme) or the like. The assignment of the resource blocks within the subframe is subject to the choice of the base station, and in case the UE does not receive any SPS-validated DCI, the resource block assignment and the other transmission parameters, like transmission mode and MCS, remain as currently configured, thereby avoiding a control signaling overhead.

SPS is used for services with periodic resource demands, and different applications may involve different arrival times of transport blocks which may be configured by the SPS interval parameters. For example, Voice over IP (VoIP) is an application where data arrives in periodic bursts of 20 milliseconds. Beyond that, as mentioned above, there are mission-critical and latency-constrained communications services; for example, URLLC (ultra reliable low latency communication) services, such as in machine-type communication and in vehicular communication, which involve pre-configured resources in shorter periods of time; for example, in periods of below 10 milliseconds down to the micro-second level and below. Applying SPS to such applications or services leads to the least possible signaling overhead when compared to frequent dynamic configuration updates, and embodiments of the present invention address SPS for such latency-constrained applications.

Further, for the aforementioned latency-constrained applications, but also for conventional applications, respective services and higher OSI layers, such as on the Application Layer, as well as rate-controlled protocols on the Network Layer (for example, TCP), may gain performance in terms of network throughput, adaption latency or RTT (round trip time) reduction if SPS may be directly influenced and/or adapted by the application, service or protocol.

First Aspect

In accordance with the present invention, a first aspect provides SPS for the user equipment using a SPS interval or periodicity that is no longer tied to the subframe domain but is tied to the transmission time interval (TTI) domain, thereby allowing implementing the SPS also for latency-constrained applications in which the periodic transmission of transport blocks is involved at certain intervals which may be freely defined on the basis of the TTI. In accordance with embodiments, the base station may configure the UE to perform SPS on the basis of a predefined interval as needed by an application, and the SPS interval may be any multiple of the TTI used by the user equipment for data transmission. The TTI to be used by the user equipment may be specified by the base station upon setting up the user equipment. Also, applications may be serviced using SPS, wherein such applications involve a periodicity for the transmission of data on allocated resources at intervals which are below the length of one subframe down to as slow as 1 millisecond or even to below 1 millisecond.

Thus, in accordance with embodiments of the present invention defining the first aspect, an apparatus may be configured to receive or transmit data on certain allocated resources over the wireless communication system with a predefined periodicity, wherein the periodicity is based on the transmission time interval for a data block to be received at or transmitted by the apparatus, with the apparatus being a receiver, such as a mobile terminal or UE, configured to receive and process a corresponding configuration message from a transmitter, such as a base station, to perform the semi-persistent scheduling or the apparatus is a transmitter, such as a base station, configured to transmit to a receiver, such as a mobile terminal, a configuration message to configure the receiver to perform semi-persistent scheduling in a manner coinciding with the apparatus' semi-persistant scheduling. The semi-persistent scheduling may be used for uplink or downlink. Depending on the apparatus being base station or mobile terminal, the apparatus may transmit payload data via allocated resources including, but not exclusively, those scheduled semi-persistently, in units of the transmission time intervals by scrambling and/or interleaving the payload data along with FEC data protecting the payload data before mapping the payload data onto the allocated resources, or receives payload data via allocated resources in units of transmission time intervals by descrambling and/or deinterleaving the payload data along with FEC data protecting the payload data upon demapping the payload data from the allocated resources. In other words, in accordance with embodiments, the apparatus is configured to perform a semi-persistent scheduling so as to receive or transmit data in plurality of subsequent intervals on certain allocated resources of the wireless communication system, wherein the size of an interval is based on the transmission time interval for a data block to be received at or transmitted by the apparatus.

This approach is advantageous as it allows changing the "granularity" at which data is repeatedly transmitted on certain allocated resources so that SPS is no longer tied to a subframe length as is done in conventional approaches, rather, the inventive approach allows adapting the size of the interval for SPS to any desired number of TTIs, dependent on the specific requirements of wireless applications. Embodiments allow for adapting the SPS interval to times substantially below a subframe length, even below 1 millisecond when the TTI is exemplarily defined as below 1 ms so as to be applicable also for low latency communication services.

Second Aspect

In accordance with a second aspect, the present invention provides an approach to implement SPS at a UE faster, for example, by providing an interface mechanism to let a higher layer in the communication system directly or indirectly communicate and/or control the SPS settings, which may change over time. Such a control mechanism, in accordance with embodiment of the present invention, allows, for example in TCP, for an optimized setting of the SPS parameters for a slow start phase in order to quickly reach a congestion avoidance phase, after which a more relaxed setting may be used and thus channel resources may be released. Another use case may be an ultra-low delay video live contribution, which over time adjusts its bit rate and/or latency requirements, so that also in such a case, general resources no longer needed may be released. On the other hand, in case the requirements for such a video transmission increase, an adjustment of the needed channel resources may be performed at the earliest possible point in time.

In accordance with embodiments of the present invention, the second aspect provides a apparatus configured to perform semi-persistent scheduling so as to receive or transmit data in a priority of subsequent intervals on certain allocated resources over the wireless communication system, wherein the apparatus is configured to controlling the semi-persistent scheduling via a configuration message. In case of the apparatus being a receiver such as a mobile terminal or UE, it may receive and process a configuration message which includes control data from controlling an operation of the receiver. In other words, in accordance with the second aspect, the use of SPS is improved as, other than in conventional approaches, the configuration message now already includes control data which may specify, for example, an activation time already at the time of configuration, for example by indicating a specific system frame number at which the SPS should be started or the like, thereby avoiding additional DCI communication overhead. Also, the configuration message may already include the information about the resources allocated and the like, so that no further message for transmitting this information to the UE is needed.

In accordance with embodiments, the configuration message may be a single message or may include a plurality of messages which may also be hierarchically structured so that upon configuring the UE for a specific service, dependent on foreseen changes of requirement of an application and/or radio link conditions, the application or service or protocol may signal the UE to change from one configuration to another configuration which means a substantial reduction in control data transmission overhead as only a trigger signal for changing from one configuration to another configuration needs to be sent but not the entire new configuration.

Third Aspect

In accordance with a third aspect, the present invention provides semi-persistent scheduling (SPS) for resources of first payload data transmissions in an SPS direction being a downlink or uplink direction, where the SPS times at which the resources for the first payload data transmissions are scheduled, are triggered by second payload data transmissions in an opposite direction being opposite to the SPS direction. The configuration may again be performed via SPS configurations which may be contained in the RRC. Configurations of such SPS may relate to the delay between the triggering second payload data transmissions such as DL transmissions, and the SPS times where the next first payload data transmissions in SPS direction, such as UL, may take place. Listening windows may be placed at such SPS times as in the first aspect. The apparatus configured to perform semi-persistent scheduling (SPS) in such a manner may be a receiver, such as a mobile terminal or UE, configured to receive and process a corresponding configuration message from a transmitter, such as a base station, to perform the counter-direction triggered semi-persistent scheduling in a manner configured according to the configuration message or the apparatus is a transmitter, such as a base station, configured to transmit to a receiver, such as a mobile terminal, a configuration message to configure the receiver to perform the counter-direction triggered semi-persistent scheduling in a manner coinciding with the apparatus' semi-persistant scheduling.

Fourth Aspect

In accordance with a fourth aspect, a configuration of the SPS is changed, or SPS is established, in a manner triggerd by a first entity, for example. The first entity is, for example, a HTTP server or a client such as in bitrate-adaptive streaming, which communicates with another entity via payload data transmitted over the wireless communication system. The message by way of which the first entity triggers the SPS configuration mode change or establishment, is not necessarily sent over the wireless communication system, but through a core network, e.g. the HTTP server sending something to the eNodeB. Another trigger may be a message indicating an event which depends on physical environmental conditions of the apparatus. The apparatus may be configured to change the configuration of, or establish, the SPS in terms of SPS interval, SPS bitrate, coding and modulation used for the SPS resources. The apparatus may be configured to change the configuration of, or establish, the SPS responsive to one or more of the following a message from the first entity informing the apparatus on a TCP slow start or TCP congestion avoidance (i.e. change of status of TCP), or a change in a bitrate version bitrate-adaptively streamed between the first and second entities; a hint on an improvement or worsening of tranmssion conditions along SPS direction;

a change in resoulion, quality or coding complexity of video or picture data transmitted over the wireless communication system using the SPS; an handover situation; TCP packet loss; and speech to pause/silence transition. The apparatus configured to trigger a configuration change or establishment of semi-persistent scheduling (SPS) in such a manner may be a receiver, such as a mobile terminal or UE, configured to initiate, for example, the SPS change or establishment by a corresponding SPS request upon which the transmitter such as a bse station may or may not confirm the SPS by issuing corresponding SPS configuration messsages, or the apparatus is a transmitter, such as a base station, configured to issue to a receiver, such as a mobile terminal, a corresponding SPS configuration meassage for a change in configuration or establishment of SPS.

In the following, further embodiments of the aforementioned two aspects will be described in detail. FIG. 3 shows an example of a conventional SPS configuration provided by RRC (see reference [5]). The configuration parameters "semi-persistentschedintervalDL" and "semi-persistentschedintervalUL" are based on a 4-bit field indicating an enumeration of 16 different modes for the SPS intervals, also referred to as SPS periods. From the 16 configurable modes, there is a selection of 10 predefined periods which are labeled sfN for a scheduling period of N subframes, with N≥10. Further, 6 dynamically adjustable periods labeled spareX are provided. The base station provides the user equipment with an additional SPS-Config mode, using, for example, an RRC connection set up message, an RRC connection reconfiguration message or an RRC connection re-establishment message, as is outlined in reference [1]. The general dependency of the intervals or periods on the basis of multiples of a subframe, as defined in reference [2], i.e., the dependency on several milliseconds, is also valid for the spareX configurations; however, when using the spareX configuration, the SPS period may be lowered down to a minimum of 1 subframe (1 millisecond), however, there is currently no scheme to operate SPS within intervals of less than 1 subframe, i.e., to be less than 1 millisecond.

Figure 4:
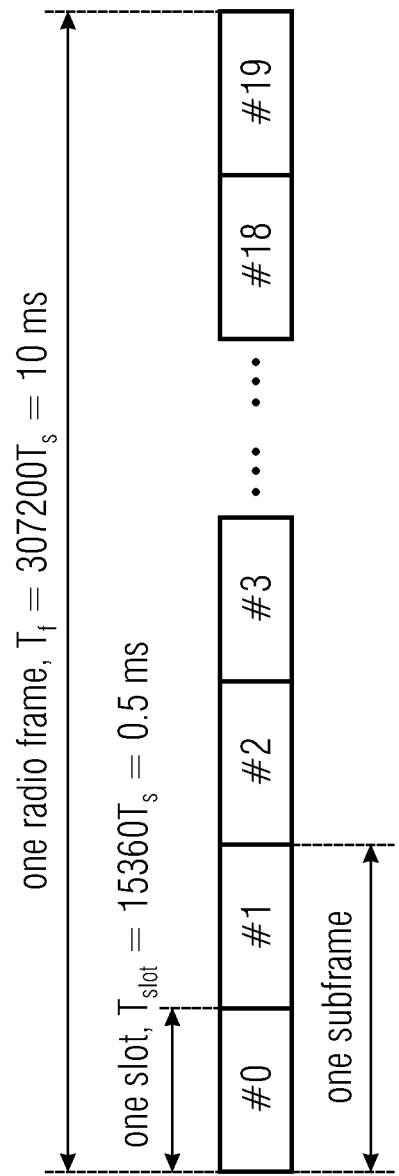
FIG. 4 is a schematic representation of a LTE frame structured type 1 (FDD) in accordance with 3GPP TS 36.211.

FIG. 4 is a schematic representation of a LTE frame structured type 1 (FDD) in accordance with 3GPP TS 36.211. One radio frame has a length of 10 milliseconds and includes 10 subframes, each subframe has 2 slots so that the radio frame includes 20 slots. Each slot has a duration of 0.5 milliseconds which corresponds to $15360T_s$ (the basic time unit in LTE, $T_s \approx 32$ ns). In accordance with conventional approaches, a subframe as depicted in FIG. 4 is equal to a transmission time interval (TTI) of the system so that defining the SPS period on the basis of subframes is sufficient. However, the so-called short TTI (sTTI) overcomes the restriction of the transmission time interval to one subframe, and instead of referring to a subframe, the following configurations may be used (see reference [6]):

Downlink (PDSCH): sTTI with 2, 3-4, 7 OFDM symbols (OS)
Uplink (PUSCH): sTTI with 2, 3-4 OFDM symbols (OS)

To be consistent with one subframe consisting of 14 OFDM symbols, as current TTI, in accordance with embodiments, the sTTIs may be selected to fit into one subframe, for example, 2+2+2+2+2+2+2 OFDM symbols, 3+4+3+4 OFDM symbols or 7+7 OFDM symbols.

In addition to the standard LTE signaling procedure using the DL and UL control channels (PDCCH, PUCCH), special control channels for DL and UL (sPDCCH, sPUCCH) may be implemented in low latency enabling sTTI modes, and a so-called "fast DCI" may be provided which contains DCI content which applies to one specific sTTI and is carried on the sPDCCH. A "slow DCI" may be provided to carry DCI content which applies to more than one sTTI and this may be carried on the conventional PDCCH also referred to as the legacy PDCCH, see for example the two-level DCI concept in reference [7]. For a sPDSCH or a sPUSCH in a given sTTI, the scheduling information may be obtained from a combination of a slow DCI and a fast DCI. In case the standard grant-based signaling is used for a shortened frame structure, the control message exchange for uplink grants may cause additional latency, may increase jitter in the system and may decrease data rates so that when adapting SPS towards latency-constrained services, an overhead reduction needs to be addressed to benefit from the SPS operation.

In accordance with the first aspect of the present invention, the scheduling interval size for a SPS operation in the LTE downlink and in the LTE uplink are now defined on a TTI basis and are no longer limited to the a number of subframes. This allows for an increased flexibility dependent on applications, services or protocols that may involve a different SPS periodicity or SPS interval for repeatedly receiving/transmitting data. Further, the inventive approach allows to operate the SPS with any change of the TTI size in future communication systems. In accordance with embodiments, the scheduling interval size is based on the sTTI, which allows SPS for latency-constrained services with intervals below 10 milliseconds down to 1 millisecond and even to below 1 millisecond. Using the sTTI as a basis for defining the SPS interval reduces or avoids control signaling overhead due he reduced number of DCI messages that need to be send.

In accordance with an embodiment, the conventional SPS-ConfigDL/UL is adapted from a subframe basis to a TTI or sTTI basis. More specifically, in accordance with an embodiment the currently used SPS-Config message, as it is shown in FIG. 3, is re-interpreted by differentiating between users in legacy mode, i.e., users operating in accordance with SPS intervals defined on the basis of a number of subframes, and low-latency operation mode. For users in a low latency operation mode, the interpretation of some fields in the SPS-Config message of FIG. 3 is automatically different, while legacy users may still use the conventional SPS-Config message. For example, the above referenced spare fields "spareX" or a subset thereof may be relabeled to be used for SPS intervals on the basis of the TTI or sTTI. Currently, the labels spareX are not by default carrying any information which is processed by the users, however, when relabeling the spareX fields as mentioned above, a low latency user may recognize the relabeled spareX fields and associate the information defined therein, for example, with information stored in a table defining the SPS interval on the basis of a predefined number of TTIs or sTTIs. The non-spare fields "sfN" in the current SPS configuration may remain valid on the subframe basis.

Figure 5:
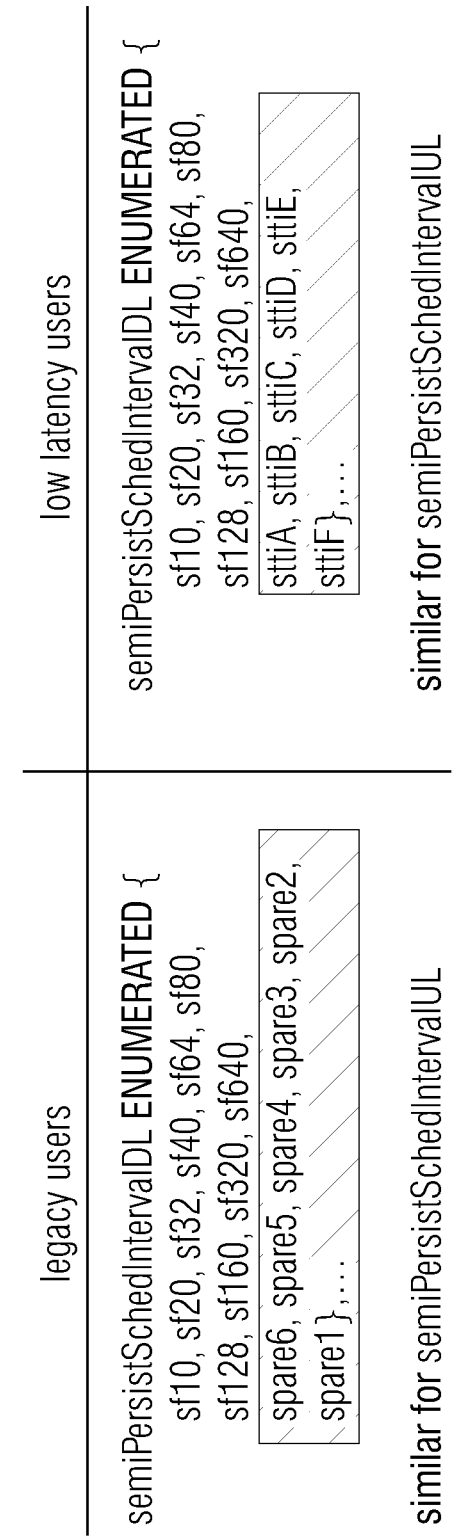
FIG. 5 shows an example for modifying the spareX fields in the conventional SPS-Config message of FIG. 3.

FIG. 5 shows an example for modifying the spareX fields in the conventional SPS-Config message of FIG. 3. On the left hand side of FIG. 5, the current configuration, that may be further used for legacy users, is shown in detail for the downlink. The fields spare1 to spare6, in accordance with the inventive approach, are labelled as sttiA to sttiF as shown on the right hand side and may be used by a low latency user for defining a SPS DL scheduling interval. For example, the time intervals for sttiX (X={A, . . . , F}), may be defined in multiples of sills, and one sTTI may include a certain number of OFDM symbols (OS), for example, 2 OS, 3 or 4 OS, or 7 OS as stated above. The sequence X may be specified accordingly, for example, sttiA may relate to a period of 2 sTTI, sttiB may relate to a period of 5 sTTI, sttiC may relate to a period of 15 sTTI and the like. For example, when the sTTI is defined to be 2 OS, sttiA may indicate a size or period of the SPS scheduling interval to be 0.28 milliseconds, sttiB indicates an interval of 0.71 milliseconds and sttiC may indicate an interval of 2.1 milliseconds. When considering the sTTI to be formed by 7 OSs, sttiA may indicate a period of 1 millisecond, sttiB may indicate an interval of 2.5 milliseconds, and sttiC may indicate an interval of 7.5 milliseconds. The information for the uplink may be modified in the same way as described above with reference to the downlink, and dependent on the TTI or sTTI basis, the fields sttiX may have different values/parameters that may be specified in corresponding look-up tables defined by a communication standard. The UE may retrieve the information from the fields sttiX and may use the information to access a table or another kind of database for retrieving the actual SPS interval or period associated with the obtained information.

The information from the fields sttiA to sttiF may be used by the low latency user when the user is in a low latency mode, however, when the low latency mode is not required but periodic transmission of data is still desired, the low latency user may use the conventional SPS interval as defined by sfN fields.

In accordance with other embodiments, not only the spareX fields of the conventional SPS-Config message may be relabeled, but also the non-spare fields "sfN". FIG. 6 shows an example in which both the non-spare fields sfN and the spare fields spareX of the conventional SPS-Config message of FIG. 3 are relabeled.

In accordance with FIG. 6, the sfN fields for defining the SPS intervals are adapted by downscaling the granularity on the TTI or sTTI basis. For example, the non-spare fields now labeled sttiN with N={10, 20, 32, 40, 64, 80, 128, 160, 320, 640} may be interpreted by legacy users like the conventional sfN fields, and may be used by low latency users when not in the low latency mode. The legacy user may understand the newly labelled fields stti10 to stti640 in the same way as the original fields sfN, namely as defining the number of subframes forming a SPS interval. The low latency user, e.g., on the basis of a look-up table, may associate the information carried in these fields with different SPS intervals defined on the TTI or sTTI basis, for example for stti10 a number of TTIs or sills is indicated yielding a combined length of 10 subframes. FIG. 6 shows on the left hand side the current SPS-Config message for the downlink (the SPS-Config message for the uplink is similar). On the right hand side, two examples are shown for relabeling the fields in the conventional SPS-Config message in accordance with the present embodiment. In both examples, the conventional labels sfN are replaced by the modified labels sttiN. In the first example, the spare fields used for signaling to low latency users in the low latency mode intervals for the SPS that are based on the number of TTIs or sills are labelled as stti_spare1 to stti_spare6. In the second example, the spare fields are labeled as in the embodiment described above with reference to FIG. 5.

FIG. 8 shows a table representing an embodiment in which the enumerated list of the conventional SPS scheduling intervals of the conventional SPS-Config message of FIG. 3 are relabeled on the basis of TTIs or sills for latency-constrained users. In accordance with this embodiment, the conventional SPS-Config message with the enumerated list of 16 elements for the downlink and for the uplink is changed with regard to the values/parameterization for the low latency users according to a look-up table specification using TTI or sTTI.

FIG. 7 shows on the left hand side the conventional SPS-Config message for the downlink (the SPS-Config message for the uplink is similar). On the right hand side, the SPS-Config message is shown as modified in accordance with the present embodiment. The spareX fields are modified in this embodiment in a way as explained above with reference to FIG. 6 (see examples 1 and 2). In both examples, the original labels sfN are replaced by the labels stti_nonspare1 to stti_nonspare10, and on the basis of the information in these fields a SPS interval may be defined on a sTTI or TTI basis, as has been described above with reference to FIG. 6.

FIG. 8 shows a table representing an example for changing the SPS interval basis for low latency users to the sTTI but keeping the possibility of configuring the same SPS intervals as in the legacy mode. FIG. 8 is an example of a look-up table that may be accessed using the information as defined in the sfN and spareX fields of the conventional SPS-Config message or that may be accessed by the relabeled fields described above with reference to FIGS. 5, 6 and 7. The first column represents the enumerated list as currently used in the SPS-Config message. The second column represents the SPS interval in milliseconds, and the third column represents the look-up table information a legacy user obtains on a subframe basis. The three columns on the left are associated with a low latency user and show the SPS interval definition on a sTTI basis for cases in which the sTTI basis is 7 OFDM symbols, a combination of 4 and 3 OFDM symbols or 2 OFDM symbols. The first ten rows are associated with the fields sf10 to sf640, and the number of sills is such that a corresponding SPS interval of 10 milliseconds to 640 milliseconds, as conventionally defined, may be achieved. For example, for a TTI of 7 OFDM symbols as a TTI a SPS interval of 10 milliseconds is defined by 20 sTTIs. The spareX fields indicate the number of sTTIs to obtain a SPS interval of 5 milliseconds, 1 millisecond, 0.5 milliseconds, 0.4 milliseconds, 0.3 milliseconds and 0.2 milliseconds, as it may be used for low latency services. The sTTI basis that is used by the low latency user may be signaled to the low latency user, for example a receiver or mobile terminal, by a base station upon setting up a communication between the base station and the user.

FIG. 9 shows another example for a look-up table which may be used for keeping the SPS intervals in the legacy mode and changes the SPS intervals based on sTTI or TTI for low latency modes for any period that do not use the millisecond SPS interval periods as defined for legacy users. For users in the low latency mode the fields sf10 to sf640 define any desired number of sills dependent on a desired length of the SPS interval to be obtained, e.g., any time period below 10 milliseconds and any time period between the time periods defined for legacy users may be obtained dependent of the sTTI used.

In accordance with other embodiments, the conventional SPS configuration may be modified so as to define an enhanced SPS configuration, also referred to as eSPS-Config message, and the SPS intervals may be defined as explained above with reference to FIGS. 5 to 9. In other embodiments, the SPS intervals may be defined on the TTI or sTTI basis and may use a new enumeration list of different bit length, i.e., using more or less elements, like bits. For example, a shortened bit field may be used to reduce signaling overhead, thereby supporting less SPS interval configurations, for example only 2 or 3 bits may be used. Extended bit fields may be used to support a larger set of SPS interval configurations, like 5 bits or 6 bits, and also the ratio of non-spare and spare fields may be defined in a variable way to cover a variety of different scenarios.

In accordance with further embodiments, the enhanced SPS configuration may provide for directly signaling a value of the SPS interval. FIG. 10 shows an embodiment for implementing the SPS-ConfigDL and SPS-ConfigUL sections of the enhanced SPS configuration, wherein FIG. 10(*a*) shows the modified SPS-ConfigDL section, and FIG. 10(*b*) shows the modified SPS-ConfigUL section. The respective fields may define the SPS interval by directly transmitting a value representing an integer value indicating the interval on the TTI or sTTI basis. No interval labeling as in the enumerated list mentioned above is needed, and the field of N bits represents $2^N$ possible SPS intervals.

In accordance with further embodiments, to reduce the number of bits to be transmitted for representing a specific interval length, a prefix code may be used, like a Huffman code with a variable length of the encoded symbols depending on the probability/occurrence. For example, assuming a SPS interval of 10 sTTI to have the highest probability from a set of five SPS intervals, in accordance with embodiments, this interval may be encoded using the codeword "11", and the other four SPS intervals may be encoded based on their ranked probabilities as "10", "00", "010" and "011" to have a uniquely decodable but variable-length bit representation. This is advantageous because shorter codewords are subject to faster decoding. In accordance with embodiments, also other prefix codes or codewords may be used for representing the SPS interval length.

In accordance with further embodiments of the present invention, a listening window is defined and signaled in addition to signaling the SPS interval. FIGS. 11a and 11b show a schematic representation for implementing a listening window having a size defined for a plurality of SPS intervals by a pre-defined number of TTIs or sTTIs. The listening window spanning two or more sTTIs or TTIs is defined at the beginning of each SPS interval. Conventionally, the SPS interval setting defines an interval (at certain periodic moments in time) at which a certain user is assigned resources within one TTI or sTTI. The user, in order to obtain information about the assigned resource, is active or listens within this specified TTI or sTTI.

In accordance with the present embodiment, additional signaling is providing for informing a user or receiver about a listening window size which may be labeled in the modified SPS-Config message as "ListeningPeriodUL" or "ListeningPeriodDL" for the uplink or downlink. The listening window may be of flexible size, and it may be signaled as having a length of only one (s)TTI as conventionally used, or more than one (s)TTI. The scheduling of SPS packets over different window sizes provides for an additional flexibility and is advantageous as longer windows allow for a jitter in the precision of the scheduled packets, and longer listening windows for delay-tolerant services allow for an optimized scheduling of delay-sensitive services at the beginning of a (s)TTI. In other words, services which are more delay-sensitive than other services receive their scheduling information, advantageously without delay, at the beginning of the window, while the other services, which are not so delay-sensitive, receive the scheduling information at some instance within the window which is still sufficient for such delay-tolerant services. A further advantage is that network delays may be compensated with a higher tolerance for late arriving packets as a receiver or user will stay active in the listening mode for a longer period of time than only the one (s)TTI as in the conventional approach.

In accordance with an embodiment, the listening window size may be indicated within the SPS-Config message as an additional parameter field, typically it may be an enumerated parameter field on a subframe basis for legacy users or on a (s)TTI basis for other users, such as latency-constrained users. Similar look-up tables as discussed above with reference to FIGS. 8 and 9 may be used for defining, on the basis of the enumerated parameter field, the size of the listening window. In accordance with other embodiments, the listening window size may be signaled directly, for example, as an integer value, or it may be signaled as a bit stream representing an integer value indicative of a (s)TTI multiplier for the window size. For example, when transmitting a bit stream representing the integer value of three, the latency-constrained user or receiver understands that a listening window size is three (s)TTIs instead of the conventional length of one (s)TTI.

In accordance with further embodiments regarding the listening window size, a stop-listening scheme may be implemented to allow an early fallback of the user equipment to a sleep mode before the current window reaches its full size. This is advantageous as it allows for energy savings at the receiver. In accordance with embodiments, the early fallback into the sleep mode may be implicitly realized after receiving data, for example directly after receiving one packet unless the one packet received indicates that additional data is to be expected on subsequent (s)TTIs. For example, the receiver may receive a resource allocation message within the listening window, for example at a first (s)TTI, and the message may indicate that there is no change in the resource allocation or the like. Thus, so no further data is expected and the receiver may return to the sleep mode until the time of periodic transmission/reception of data. In a situation in which the resource allocation message indicates a change in the resource allocation or the like, the additional information may be provided in the next (s)TTI so that the receiver remains awake. In accordance with other embodiments, the receiver may be signaled a bit to switch off listening. For example the signaling may be provided by the base station instead of the scheduling message.

The control messages looked for during the listening window may an activating, deactivating or resource allocation message indicating changes.

As can be seen from FIG. 11b, the listening window may start at the beginning of the SPS interval as shown in FIG. 11a. However, alternatively, the listening window starts one or more transmission time intervals prior to the beginning of an SPS interval as shown in FIG. 11b, with two being exemplarily being shown in FIG. 11b, and ends at least one transmission time interval after the beginning of the SPS interval. The numbers may, as described, be configurable. The receiver or mobile terminal may stop listening for the control messages prior to an end of the listening window, responsive to certain control messages during the listening window such as one explicitly indicating a preliminary or final deactivation of an allocation of resources of the communication wireless communication system for the semi-persistent scheduling, one indicating a change of a configuration of the semi-persistent scheduling, and/or one indicating a spectrotemporal position of resources of the wireless communication system for the semi-persistent scheduling for a current SPS interval, without indicating the existence of further resources being allocated within any of the subsequent (s)TTIs within the listening window, so that the receiver stops listening for further control messages after having received the resources for the semi-persistent scheduling for the current SPS interval.

In a default mode, quasi as fallback solution, the SPS resources are located at the end of the listening window. I.e., in the preceding TTIs, changes can be signaled. Otherwise, the fallback resource is taken. This reduces signaling overhead. That is, the resource for the semi-persistent scheduling for a current interval is taken for transmission or reception of SPS payload data from a resource block within the last transmission time interval within the listening window, coinciding in intra-TTI position with a default position, depending on whether one or more of the following conditions being fulfilled: the receiver has not yet stopped listening for the control messages, the receiver does not have already accessed the resource for the semi-persistent scheduling for the current interval from a resource block of a transmission time interval preceding the last transmission time interval of the listening window; and there is no control message within a control channel of the last transmission time interval which indicates a position of the resource block within the last transmission time interval. The default position may have been indicated within the configuration message, or is the last intra-TTI position used in the immediately preceding SPS interval.

The embodiments described in accordance with the first aspect concern an improvement of the SPS by extending it to SPS intervals no longer being a multiple of a subframe length, but allowing for a definition of arbitrary lengths, e.g., lengths even shorter than 1 millisecond as it may be used for low-latency applications. In the embodiments described above, the conventional SPS-Config message had been modified so as to signal the respective modified SPS interval to a receiver. However, as stated earlier, the SPS-Config message does not start the actual SPS at the user. As explained in reference [3] an additional activation message is involved which needs to be validated by the receiver so as to start the SPS. This additional message provides additional control data transfer overhead which, in accordance with the second aspect of the present invention is reduced by modifying the SPS-Config message so that additional control data for controlling the operation of the receiver is included already in the configuration message as originally sent. The following embodiments concerning the provision of additional control data in the SPS-Config message may be used both for legacy users for which the SPS interval is signaled on the basis of the subframe length, and in the above described embodiments of the first aspect, in which the SPS interval is signaled on the basis of the TTI or sTTI.

In accordance with a first embodiment of the second aspect of the present invention the content of a SPS-validated DCI message, that is currently transmitted separate from the SPS-Config message on the PDCCH or the sPDCCH, is "piggybacked" into the SPS-Config message.

FIG. 12 shows a representation of a SPS-Config message in accordance with an embodiment in which the activation/release of the SPS is signaled to the receiver together with the SPS-Config message. The SPS-Config message includes the additional fields "activation time", "activation delay" and "time to live". In accordance with one example, only the activation time is indicated in the SPS-Config message, thereby providing an automatic and non-DCI enabled SPS activation by defining the activation time in the SPS-Config message as provided by the RRC. The signaling of the activation start may indicate, for example, a subframe number, a radio frame number or a sTTI number at which the SPS is to be started. In accordance with further embodiments, to allow for a precise activation timing and offset between the uplink and the downlink, an additional delay may be separately signaled, for example as a subframe number, as a radio frame number or as a sTTI number for the downlink and the uplink using the field "activation delay". In accordance with yet further embodiments, to provide for an automatic release of the SPS, the time-to-live may be signaled for the uplink and the downlink so that, once the time period (defined as subframes, radio frames, or TTIs) is reached, the SPS is automatically terminated without additional control data traffic. The approach described with reference to FIG. 12 is advantageous as it avoids the need to frequently transmit, monitor and decode SPS-validated DCI messages so as to allow for a SPS activation.

In accordance with other examples, instead of integrating the activation and release information into the SPS-Config message, but to also avoid the just mentioned frequent monitoring and decoding of SPS-validated DCI messages, the activation and release may be signaled by additional control bits that are integrated in the transmitted user payload data on the PDSCH (DL) or the PUSCH (UL), for example as an RRC message.

In accordance with further embodiments, instead of or in addition to the signaling of the activation/release of the SPS is the SPS-Config message, other SPS-relevant DCI content may be incorporated into the SPS-Config message. Embodiments allow to fully skip listening to SPS-validated DCI messages on the PDCCH as all SPS-relevant signaling information may be transferred from a DCI message into the SPS-Config message, e.g., in situations in which stable channel conditions may be assumed. Also, SPS intervals defined on the (s)TTI basis may use this approach as channel dynamics are assumed to not change so quickly, so that frequent SPS reconfigurations are not needed. FIG. 13 shows a table indicating examples of SPS-relevant DCI content that may be incorporated into the SPS-Config message in accordance with embodiments of the present invention.

More specifically, the table of FIG. 13 indicates in the top row an example of information conventionally provided by the PDCCH, the center row indicates a first example of information or content that may be incorporated into the SPS-Config message, and the bottom row indicates a second example of information or content that may be incorporated into the SPS-Config message that is provided by the RRC.

In accordance with the conventional approach no signaling of resource block assignment and/or other DCI information in the SPS-Config message is envisaged, rather all such data and information is provided via the SPS-validated DCI message.

If the DCI signaling is completely incorporated into the eSPS-Config, DCI messages are not required for the SPS transmission and may not be transmitted for this purpose. However, the base station would then not be able to deactivate the SPS-transmission of a mobile terminal operating SPS in uplink direction through DCI messages. Therefore, if the base station wants to deactivate this SPS-uplink transmission, it may respond with a NACK (non-acknowledgment) message. ACK/NACK messages are transmitted via a PHICH (Physical Hybrid ARQ Indicator Channel) which any transmitter of payload data has to listen subsequent to the transmission of the payload data. In case of receiving a NACK, the payload transmitter reads the DCI control messages of the following TTIs so as to, normally, initiate the mitigation of the failure transmission called HARQ. Thus, the mobile terminal operating SPS in uplink direction as described above has to listen to the DCI messages for a (H)ARQ response of the failed SPS-packet. Now, in the DCI-message the cancellation of the SPS-transmission is signaled. The NACKs, thus "abused" by the base station, can be called Fake-NACK, since they are not used to indicate an erroneous packet, but initiate the cancellation of the SPS uplink transmission or otherwise make the receiver or mobile terminal listen to an SPS control related control message. In other words, a mobile terminal may transmit data within resources allocated by the semi-persistent scheduling in uplink, wherein the apparatus is configured to, responsive to a NACK message, look in a control message succeeding the NACK message for an hint on a transmission failure and information concerning a reconfiguration of the semi-persistent scheduling. The base station sends such NACK although correctly having received data having received from the transmitter via the SPS resources in uplink, but inserts a SPS reconfiguring control message into the DCI in the TTI inspected by the mobile terminal responsive to the Fake NACK. Thus, the fact that semi-persistent scheduling is normally configured by way of configuration messages contained within a payload section of resources of the wireless communication system allocated via the semi-persistent scheduling or in a non-semi-persistent manner, does no longer disturb. The semi-persistent scheduling may be reconfigurable, in addition to control messages found responsive to any NACK message, by way of configuration messages contained within a payload section of resources of the wireless communication system allocated via the semi-persistent scheduling or in a non-semi-persistent manner exclusively.

In accordance with the first example of the inventive approach, a full signaling of all resource block assignments and all other related information for the transfer of data is incorporated into the inventive SPS-Config message so that, when also information about the frequency hopping pattern is included, no DCI messages are needed at all for the SPS operation. In case the frequency hopping pattern is not included as part of the SPS-Config message, DCI messages are still not needed.

In accordance with the first example of the inventive approach partial information is included into the SPS-Config message which allows configuring the DCI message as a reduced or narrowband DCI message, e.g., in a self-contained frame structure. This approach may be suited for devices of the internet of things (IoT) or for saving battery power at the receiver.

FIG. 14 shows a DCI format zero, which is an uplink DCI format for PUSCH scheduling as it is used in conventional approaches and which defines the highlighted fields, the frequency hopping information, the resource block assignment (up to 13 bits) and the five bits for the MCS level messaging. Shifting the highlighted fields into the inventive SPS-Config message is explained with reference to FIG. 15 showing the SPS-Config UL for the inventive SPS-Config message including the information highlighted in FIG. 14. Shifting the frequency hopping information to the SPS-Config message enables a frequency diversity of the narrowband transmission resources and no DCI message is needed on the PDCCH, as shown in the first example of FIG. 13, or allows for a reduced narrowband DCI message as indicated in the second example of FIG. 13. The frequency hopping procedure may be performed in accordance with conventional standards for the general UL on PUSCH as defined in references [8] and [9].

In accordance with embodiments of the present invention, the above-mentioned approach for frequency hopping as used in the uplink is expanded so as to allow resource allocation hopping patterns in the downlink. In accordance with these embodiments, frequency hop-ping for a downlink SPS is supported. In the downlink, currently frequency hopping is only enabled for UEs in the mode "bandwidth reduced low complexity (BL)" and "coverage enhancement (CE)", as defined in reference [10]. In accordance with the present embodiment, the frequency hopping will also be enabled for DL SPS by including into the SPS-ConfigDL section of the SPS-Config message the frequency hopping information.

Currently, the frequency hopping works on an inter-subframe basis as illustrated in FIG. 26a by potentially providing a different allocation for slot zero and slot one, and on an intra- and inter-subframe basis as illustrated in FIG. 26b with different sequence options as outlined in reference [8] so as to allow for allocation changes over slots and subframes. These modes are also enabled for the SPS DL on the general basis of one OFDM symbol as illustrated in FIG. 26c, thereby permitting for more frequent hopping. Further, a hopping basis may be introduced in the SPS-Config message indicating the number of, for example, OFDM symbols are for which a hopping occurs which allows for a more granular hopping procedure.

Thus, frequency hopping information conveyed by configuration messages may indicate a hopping pattern and/or a hopping basis, i.e. spectral and/or temporal granularity, of the hopping. By way of FIG. 26a to FIG. 26c a switching in the hoping pattern's temporal hopping granularity is illustrated, with the hopping basis being signaled in the configuration message.

In accordance with further embodiments, which concern the third aspect, but may use similar signaling in form of SPS configurations, the inventive approach allows for a conditional SPS UL grant responsive to specific traffic patterns that may be recognized and cause a specific downlink message which, in turn, triggers sending one or more uplink messages. For example, to steer the movement of an industrial robot, like its axes, tool center point and the like, or an automated guided vehicle data on the target, for example precise data on the coordinates for the next step or relative data of the direction assuming constant speed, are sent in a downlink while an answer on a current position, like the coordinates, is transmitted backwards in the uplink. In accordance with the embodiments described herein, for DL/UL message pairs, like the ones mentioned above, a special indicator is provided in the SPS DL configuration so as to trigger SPS UL grants. In case a SPS UL has been already established before the triggering DL message starts, the configuration may be modified by the DL trigger.

Figure 16A:
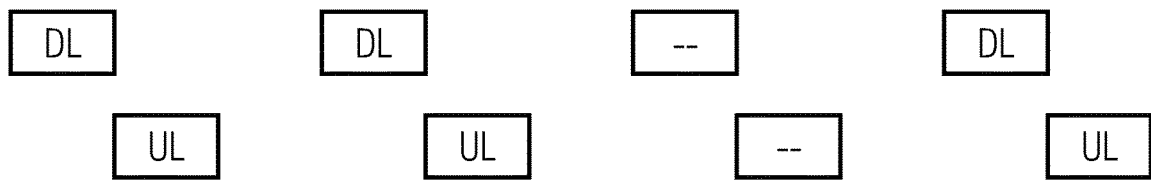

In the following embodiments for triggering SPS UL grants will be described with reference to FIG. 16. FIG. 16(a) is a schematic representation of a direct UL grant. In accordance with this embodiment, a SPS DL triggers a UL grant and an instant UL transmission is performed directly when the DL is received. Thus, the uplink adapts itself to the SPS intervals of the DL configuration. In accordance with examples, if some DL messages are skipped, the corresponding UL grants are skipped as well. The skipped DL message and the skipped UL message are indicated by the blocks bearing "—" rather than the terms DL and UL, respectively.

Figure 16B:
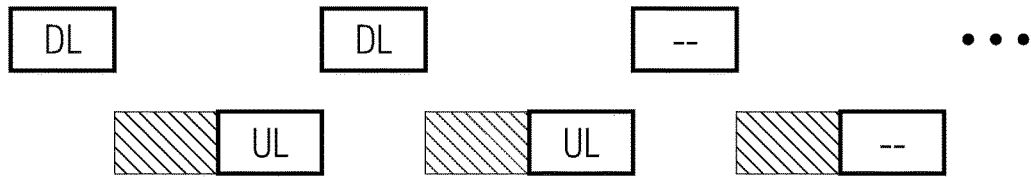

FIG. 16(b) is a schematic representation for a time-shifted UL grant. In accordance with this embodiment, the SPS DL message triggers a UL grant, and the UL transmission will be performed with some delay, for example some (s)TTIs, to the received DL message. The UL adapts itself to the SPS intervals of the DL configuration with some reaction time, and if some DL messages skip, the UL grant is skipped as well. In FIG. 16(b), the delay in starting the UL transmission is schematically represented by the hatched fields preceding the UL blocks. The skipped DL message and the skipped UL message are indicated by the blocks bearing "—" rather than the terms DL and UL, respectively.

Figure 16C:
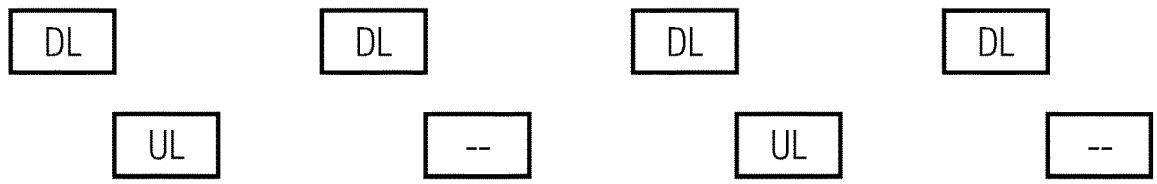

FIG. 16(c) is a schematic representation for direct/time-shifted UL grants with blanking. The SPS DL message triggers the UL grants, and the UL transmission is either directly after receipt of the DL message or is performed with some delay, like a (s)TTI delay relative to the DL message. The UL adapts itself to the SPS intervals different to the DL configuration in that every nth interval is skipped, in which no uplink transmission occurs. The blanked uplink message is indicated by the blocks bearing "—" rather than the term UL. In the example of FIG. 16(c) every second interval is skipped, i.e., n=2.

Figure 16D:
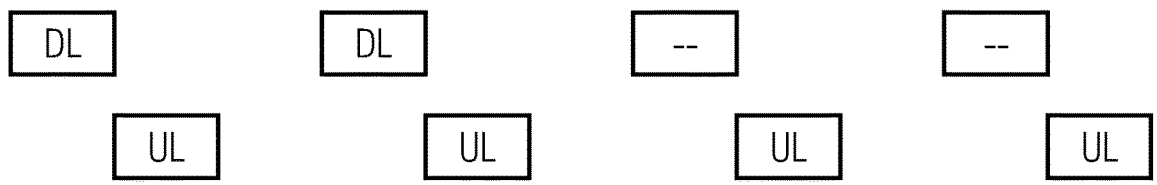

FIG. 16(d) is a schematic representation of an embodiment in which a direct/time-shifted UL grant with keep-alive option after DL stop/interruption is performed. The SPS DL message triggers the UL grant, and a UL transmission occurs either directly after receipt of the DL message or with some delay, like a delay of some (s)TTIs. In case the SPS DL is finished or interrupted, the established SPS UL intervals are kept alive. The finished or interrupted DL message is indicated by the blocks bearing "—" rather than the term DL.

As became clear from the brief description of the fourth aspect, conditional UL, for instance, can be done with an UL SPS that defines the delay and resources that are activated when data in the DL is received.

With regard to the examples described in FIG. 16, it is noted that the same schemes slide upon receiving uplink request messages which automatically trigger downlink messages as described above. In accordance with further embodiments, the above-mentioned UL grant may be performed in response to a non-SPS DL transmission, for example in response to a general DL payload data transmission, and a SPS UL mode may be triggered using the above described schemes.

Figure 16E:
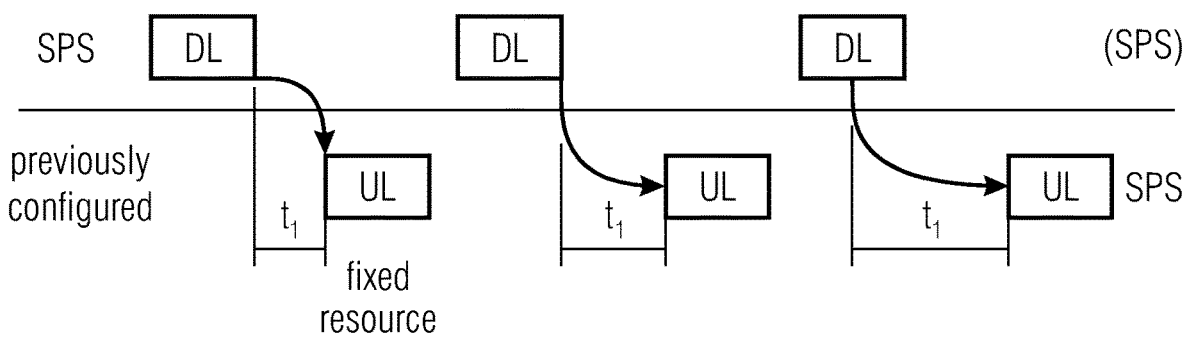

As becomes clear from FIG. 16e, the concept of FIG. 16 may lead to SPS intervals between the SPS times of varying length, as the triggering transmissions need not occur at a regular basis.

In addition to using DL messages as an trigger for SPS configuration or SPS changes, such SPS information could be triggered for UL and/or DL based on other events which are available at and/or signaled to the transmitter and receiver. E.g., it is possible that the base station observes an event and indicates the SPS change, where such event could be a changing rate of DL packet arrivals from the core network (triggering a change of DL SPS) or changing channel conditions (triggering adaption of UL SPS interval frequency and resources). Also, the may UE observe the event and indicates SPS change, e.g. video conferencing where the video application running on the mobile terminal changes the resolution to full screen (triggering a change of DL SPS) or changes of involved UL data rates, e.g. in video records where a rather static observed environment changes to moving environments (triggering a change of UL SPS). Also, both participating entities (base station and mobile terminal) may have common knowledge about the event meaning no additional signaling is needed. Then, the event itself triggers the action, e.g. assume handover situations (UE changes from cell 1 to cell 2) triggering SPS or events arising from higher layer protocols such as video quality changes, speech pause/silence in audio transmission or TCP packet loss triggering SPS.

In other words, the semi-persistent scheduling (SPS) may be deactivated, activated or reconfigured responsive to an event detectable for the mobile terminal and base station as indicated above as part of the fourth aspect. As also indicated above, messages of an higher layer entity such as an HTTP server or HTTP client may by used as a trigger as well.

Figure 17:
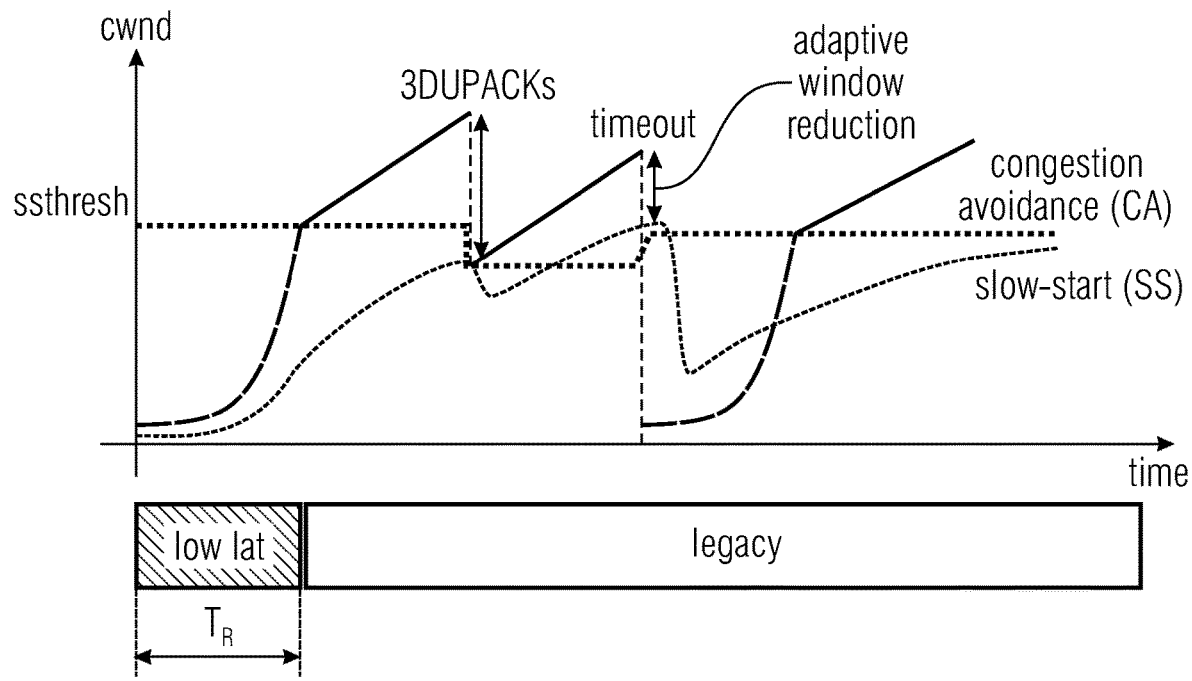
FIG. 17 shows typical TCP phases with an acceleration of the slow-start phase by utilizing the inventive (s)TTI low-latency connection for a time $T_{SS}$ with a subsequent automatic switch to a legacy operation.

In accordance with further embodiments, the present invention provides for an automatic change of a SPS configuration over time. Such a change may be caused by an application, a service or a protocol, e.g., a higher layer protocol, like the TCP. In accordance with embodiments, SPS may be used to optimize the performance of higher layer protocols, like TCP connections. In case of a TCP transfer, an SPS-configuration on a (s)TTI basis may be used during the TCP slow-start phase reach a threshold. FIG. 17 shows typical TCP phases with an acceleration of the slow-start phase by utilizing the inventive (s)TTI low-latency connection for a time $T_{SS}$ with a subsequent automatic switch to a legacy operation. In the initial state, the slow-start phase, the TCP window size is increased to reach the highest connection capacity, and using sTTI in this phase decreases the $T_{SS}$ time such that high connection speeds may be reached fast. For phases after reaching the threshold ssthresh, the sTTI operation may not yield substantial performance gains, and hence an automatic switching to a standard SPS operation may be performed (once ssthresh is reached). The switching between the sTTI-based SPS configuration and the standard or legacy SPS configuration may also be triggered by an external protocol or in response to a signaling indicative of an end-to-end TCP connection.

Figure 18:
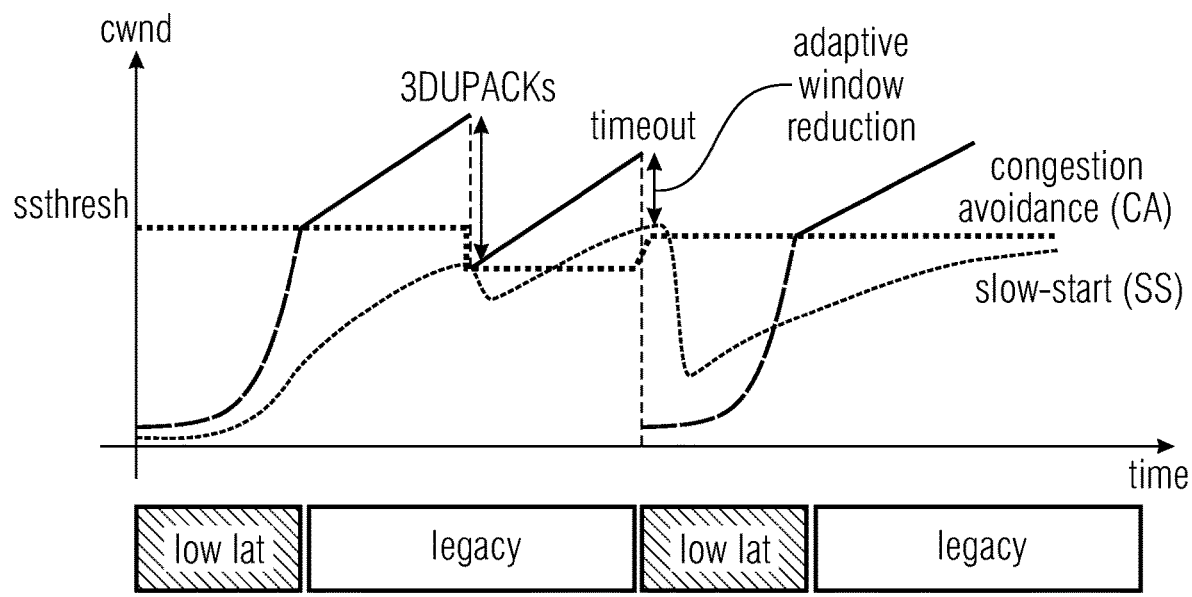
FIG. 18 represents an automatic triggering of SPS switching between low-latency and legacy operations at the beginning, and an analysis-based triggered SPS switching between the legacy operation and the low-latency operation at a later time.

In accordance with further embodiments, an additional analysis may be carried out, like a deep packet inspection or a throughput analysis. This additional analysis allows to recognize timeouts or a restarting of the TCP slow-start procedure. Upon detecting such timeouts or a restarting of the TCP slow-start procedure the low-latency approach described above may be provided again so as to speed up the transfer so as to reach the congestion avoidance (CA) state faster. This is shown in further detail in FIG. 18, corresponding substantially to FIG. 17 but representing an automatic triggering of SPS switching between low-latency and legacy operations at the beginning, and an analysis-based triggered SPS switching between the legacy operation and the low-latency operation at the center of the graph.

The above described approaches for switching between low-latency and legacy operations may be implemented in accordance with an embodiment by adding an additional field to the SPS-Config message. In accordance with a first embodiment, a time to live (TTL) field is added to the SPS-ConfigDL section in the corresponding UL section of the SPS-Config message so that the low-latency operation may be disabled after a given time interval, like the time interval $T_{SS}$. The scale for the time may be the scheduling intervals and may be realized with a simple counter variable. Alternatively, a different standard time unit, for example (s)TTI, subframe, slot or seconds may be used. Dependent on a use case, instead of signaling the values for the time to live directly, less signaling may be achieved by using an enumerated field with common values or codewords. FIG. 19 shows examples for a modification of a SPS-Config message in a way as described above, wherein FIG. 19(a) shows a modified SPS-ConfigDL section indirectly signaling the time to live, and FIG. 19(b) shows a SPS-ConfigDL section the time to live field indirectly signaling the time to live. FIG. 19(a) shows on the left-hand side a conventional SPS-ConfigDL section of a SPS-Config message, and on the right-hand side a modified SPS-ConfigDL section including the additional time to live field "TTL" defining the value of the time to live directly by an integer value. FIG. 19(b) shows a similar embodiment except that in the modified SPS-ConfigDL section the time to live field does not directly signal a specific value but includes an enumeration of four values tt11 to tt14.

In accordance with further embodiments, for implementing the above mentioned automatic change of a SPS configuration, the SPS configuration message may be modified by adding a Time to Start (TTS) field so as to allow starting a certain SPS configuration once a preceding SPS mode has expired. The Time to Start field delays the start of the certain SPS configuration so that an expired SPS configuration may be succeeded by the certain SPS configuration as signaled in advance. The scale for the time may be the scheduling intervals and may be realized with a simple counter variable. Alternatively, a different standard time unit, for example (s)TTI, subframe, slot or seconds may be used. Dependent on a use case, instead of signaling the values for the time to start directly, less signaling may be achieved by using an enumerated field with common values or codewords. FIG. 20 shows examples for a modification of a SPS-Config message, wherein FIG. 20(a) shows a modified SPS-ConfigDL section indirectly signaling the time to start, and FIG. 20(b) shows a SPS-ConfigDL section the time to live field indirectly signaling the time to start. When compared to FIG. 19, the difference is that in FIG. 20 instead of defining the TTL field, the above mentioned TTS field is defined.

Figure 21:
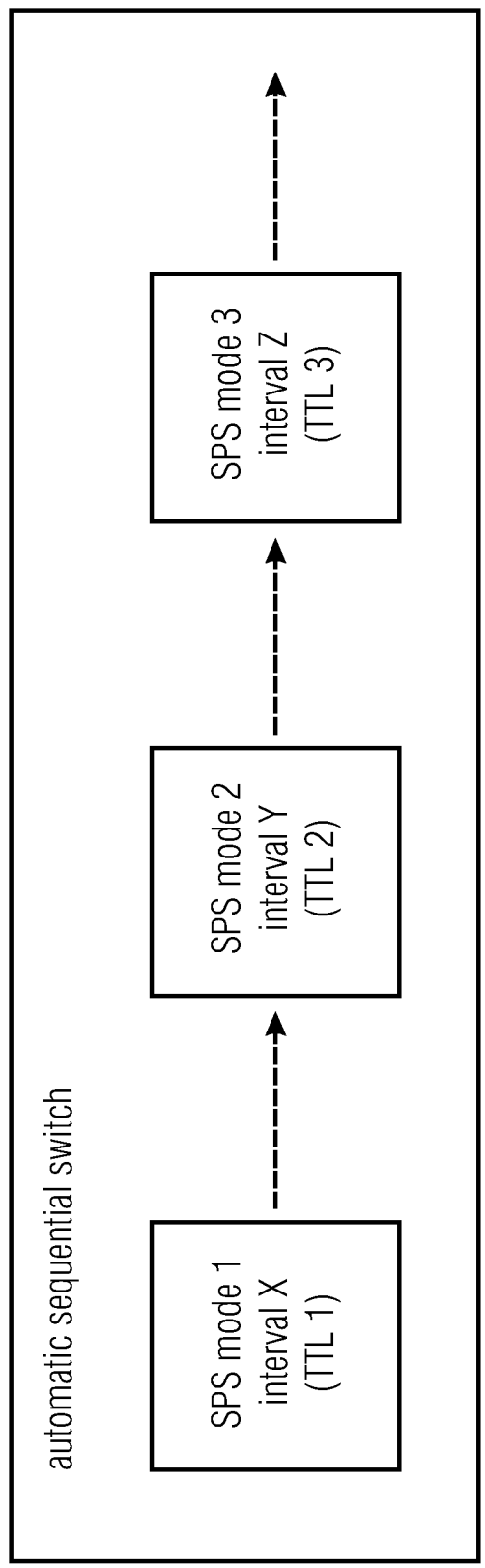
FIG. 21 represents an automatic switching between SPS configurations provided in accordance with the teachings of the present invention.

Some specific embodiments for automatically changing SPS configurations have been described above, however, the inventive approach is not limited to such scenarios. In accordance with the teachings of the present invention, an automatic switching between SPS configurations may be provided in a way as schematically represented in FIG. 21. A user or receiver may be configured, using a modified SPS configuration message, so as to include a plurality of SPS configurations, indicated in FIG. 21 as SPS mode 1 to SPS mode 3 each defining a specific SPS interval X, Y or Z of the same or of different lengths, either in terms of subframes or in terms of TTIs. Responsive to trigger signals a switching from SPS mode 1 to SPS mode 2 and from SPS mode 2 to SPS mode 3 may be performed. The switching may be responsive to an external signaling or by including into the respective modes the above described TTS and/or TTL information. In accordance with embodiments, a single configuration message including the different modes may be provided to the receiver. In other embodiments the receiver may receive a plurality of separate configuration messages.

In accordance with further embodiments, that will be described in further detail below, the automatic sequence switching depicted in FIG. 21 may also be achieved using a nested SPS scheme including multiple SPS modes within one SPS-Config message and a configuration selection is based on a predefined patterns, dependencies or policies between the SPS configurations. In accordance with embodiments, a toggle mode may be implemented so that the respective configured SPS includes an explicit link to activate another one of the SPS modes. In accordance with other embodiments the SPS may be configured to take over from a preceding SPS once the preceding SPS has been released. Thus, in accordance with the embodiments described with regard to FIG. 21, a set of sequential SPS configuration messages will be preconfigured and signaled between the involved entities and the switching between the sequential SPS configuration messages may be achieved automatically based on a timer, for example the above described TTL or TTS, or may be achieved by signaling the particular SPS configuration and selecting the configuration from a nested SPS configuration set.

Figure 22:
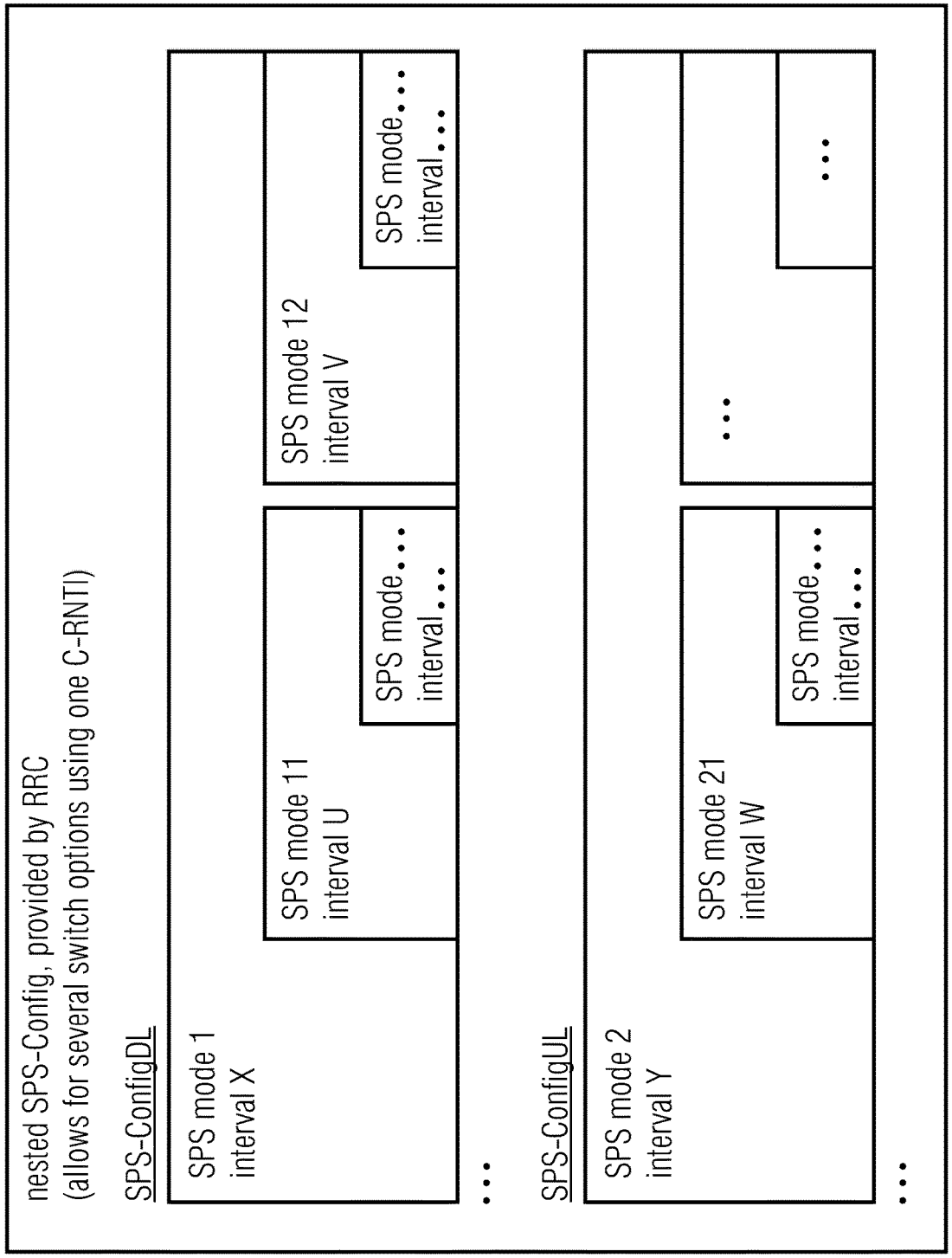
FIG. 22 shows a schematic representation of a nested SPS-Config message as it may be provided by a radio resource control (RRC) which allows for several switch options using only a single C-RNTI which may be the SPS C-RNTI.

FIG. 22 shows a schematic representation of the above referenced nested SPS-Config message as it may be provided by a radio resource control (RRC) which allows for several switch options using only a single C-RNTI. In the conventional SPS-Config definition, the associated C-RNTI is included as well as a single SPS-ConfigDL and/or a single SPS-ConfigUL, as may be seen from FIG. 3 above. In accordance with embodiments of the inventive approach, a nested SPS configuration is provided which enables and activates multiple SPS schemes at once without opening several different RRC connections. The switch among the SPS modes may be message-triggered or automatic. FIG. 22 shows the nested SPS configuration in accordance with an embodiment showing a SPS-ConfigDL section including a first SPS mode 1 with a SPS interval X and additional nested SPS modes 11 and 12 with different or the same SPS intervals. FIG. 22 also shows the SPS-ConfigUL section for a nested SPS-Config message defining the different SPS modes for the uplink in a similar way as for the downlink.

FIG. 23 shows an example for implementing a nested SPS-ConfigDL section in a SPS-Config message by incorporating a further SPS-ConfigDL instance in the setup field which allows to specify multiple SPS-ConfigDL sections. Corresponding UL sections may be implemented in the same way.

In accordance with embodiments, there are several ways to activate the SPS modes in the nested SPS-Config message. For example, a DCI activation message may be sent which activates the first nested SPS-ConfigDL/SPS-ConfigUL, and a further DCI activation message toggles through the nested SPS configuration list. In accordance with another embodiment, a single DCI SPS activation message may be sent on the PDCCH using the correct SPS C-RNTI, for example in case of a VoIP service with additional constant bitrate video service, and this message activates all SPS configurations in the nested list, thereby saving signaling overhead. In accordance with yet another embodiment, a modified DCI may be provided, which enables a specific configuration in the nested list. In accordance with further embodiments, the Time to Live information described above may be used so that, once a configuration in the nested list has expired in accordance with the Time to Live field, the next configuration in the list is automatically activated. In accordance with yet another embodiment, the full signaling information relevant for the SPS operation in the nested SPS configuration may be provided by the RRC thereby avoiding the need to use any DCI on the PDCCH, for example in a similar way as described above with reference to FIGS. 12 to 15. That is, the configuration message may be indicative of more than one SPS interval or SPS configuration modes determined, inter alias, with respect to SPS interval length. The several SPS intervals or SPS configuration modes may relate to the same RNTI. The apparatuses communicating via such SPS channel may switch between the several SPS intervals or SPS configuration modes, or selectively activate and deactivate one or more of the SPS intervals or SPS configuration modes. They may signal the switching or selective activation and deactivation to one another by configuration messages and/or control messages. That is, one or more than one of the SPS intervals or SPS configuration modes may allowed to be active concurrently. The several SPS intervals or SPS configuration modes may be referenced by the configuration messages and/or control messages using the common RNTI, e.g. for LTE SPS C-RNTI, such as by scrambling, and using an SPS configuration index which discriminates between the several SPS intervals or SPS configuration modes, In accordance with further embodiments, a higher layer interface may be provided for an interaction, a setting and an activation of different SPS settings/parameters. For example, the SPS-Config message may be provided to the base station and may also be activated at the base station. In order to meet possible short-term changes in the requirements of an application/protocol/service using an actual bearer, it is desired to interact with this activation procedure. One or more of the following approaches may be used: an event-driven approach or a message-driven approach. In case of an event-driven approach, the base station may detect an event on which a specific SPS setting is immediately activated or is activated after a specific time. Such events may be based on a deep packet inspection, an interaction with a server (a device not under control of the base station) via messages, or interaction with a client (a device under control of the base station) via messages. The message-driven interaction for setting an activation of different SPS settings/parameters may involve a client interacting with the base station. Like a bearer setup-message in which bitrate requirements and the like are provided, the client may forward a message including a bit rate, a latency, scheduling information, an activation time or an activation event information for an existing bearer to the base station so as to indicate the desired SPS setting for a current time or for a later point in time or when a specific event occurs. Event-driven and message free, an eNB and an UE may agree upfront through SPS config or other means on a specific event (e.g. GPS position, CQI value, MCS Level) on which the SPS configuration and/or resource allocation changes. Switching between different SPS config settings may happen on eNB and UE as soon as the event happens. Here it should be mentioned that, as illustrated above related to the fourth aspect, it may be a higher layer message which is exchanged between a server (e.g. HTTP server) and eNodeB. This message could mean TCP slow start or TCP congestion avoidance, so that the eNodeB could react to it by initiating an SPS switching. The message could be either forwarded to the UE and this react to it or as discussed, could be use to initiate a lower layer message to change the SPS configuration.

Figure 24:
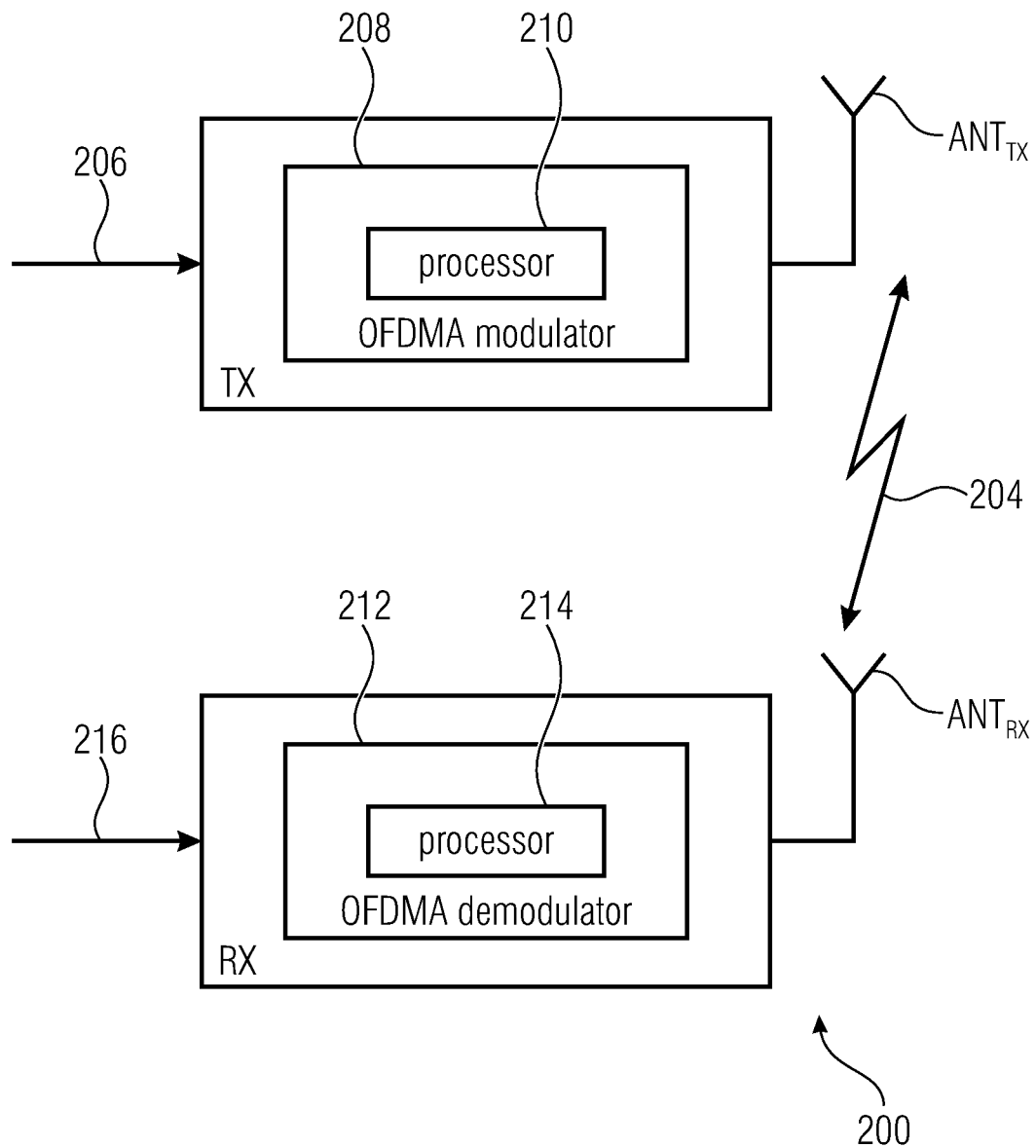
FIG. 24 is a schematic representation of a wireless communication system for transmitting information from a transmitter to a receiver.

Embodiments of the present invention may be implemented in a wireless communication system as depicted in FIG. 1 including a transmitter, like a base station, and a receiver, like a mobile terminal. FIG. 24 is a schematic representation of a wireless communication system 200 for transmitting information from a transmitter TX to a receiver RX. The transmitter TX includes at least one antenna $ANT_{TX}$ and the receiver RX includes at least one antenna $ANT_{RX}$. In other embodiments, the transmitter TX and/or the receiver RX may include more than one antenna to implement a MIMO, SIMO or MISO. As is indicated by the arrow 204 signals are transmitted from the transmitter TX to the receiver RX via a wireless communication link, like a radio link. The transmission may be in accordance with the OFDMA communication approach, and the above referenced transmission time interval indicates the time period of a radio transmission from the transmitter TX to the receiver RX. The transmitter TX comprises an input 206 for receiving data to be transmitted to the receiver RX. The input data 206 is received at an OFDMA modulator 208 comprising a signal processor 210 for processing the received signals 206 to generate a data signal to be transmitted to the receiver RX. The signaling between the transmitter TX and RX is in accordance with the above described embodiments of the present invention, e.g., the transmitter may include the OFDMA modulator operating so as generate the SPS Config message including the SPS interval defined on the TTI basis and/or including additional control data. The receiver RX receives via the antenna the signal from the transmitter TX and applies the signal to the OFDMA demodulator 212 including a signal processor 214 for processing the received signal to generate an output signal 216.

Figure 25:
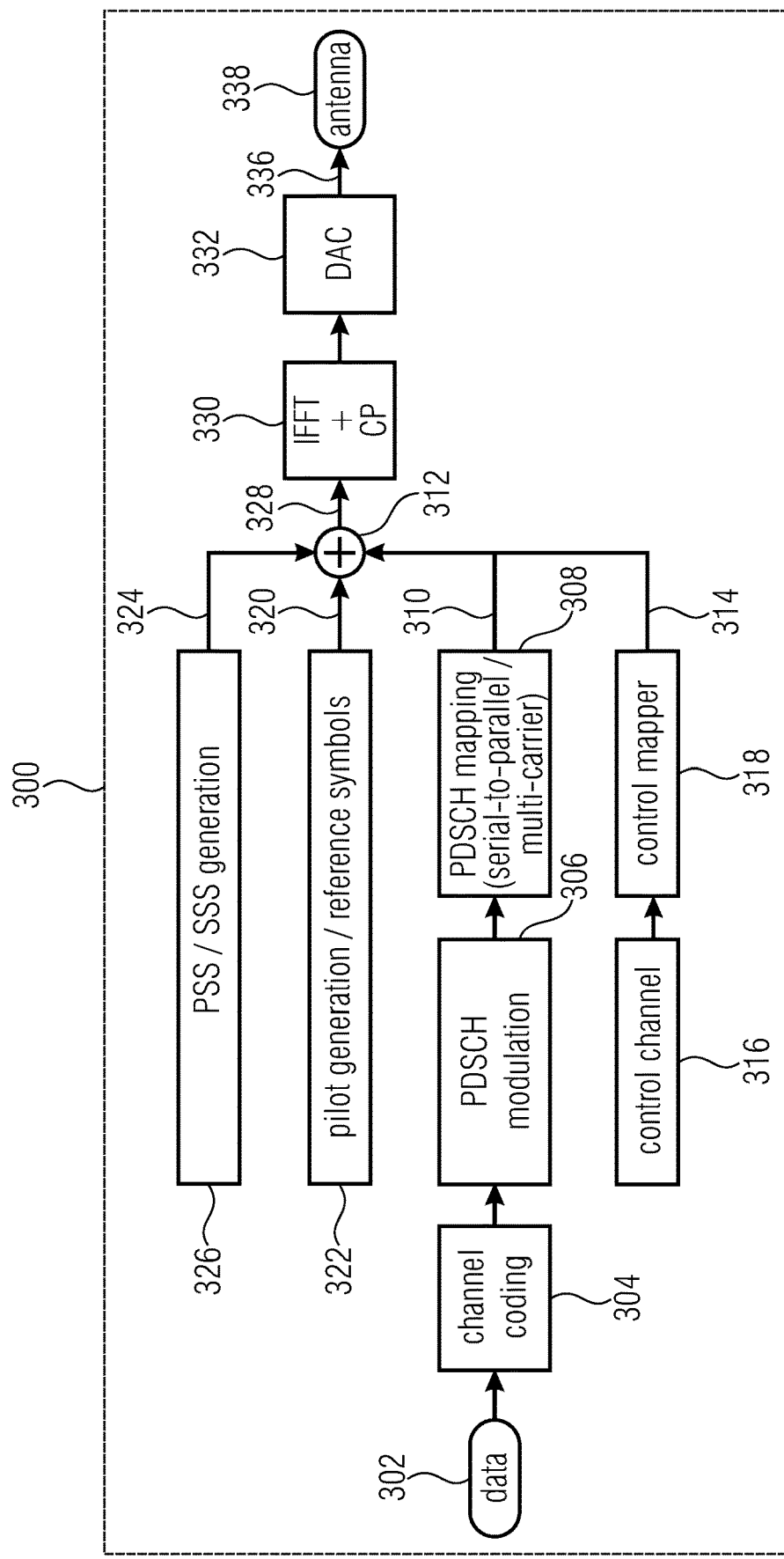
FIG. 25 is a schematic representation of transmitters in a wireless communication system for transmitting data or information to a receiver in accordance with embodiments.

FIG. 25 is a block diagram of a transmitter 300 in a wireless communication system for transmitting information to a receiver in accordance with embodiments described above. The transmitter 300 receives data 302 that is encoded by the channel encoder 304, modulated by the modulator 306 and mapped to the multiple carriers by the mapper 308. The signal 310 is combined at 312 with control signals 314 provided by the control channel unit 316 and the control mapper 318, with pilot symbols 320 from the pilot symbol generator 322, and with PSS/SSS signals 324 from the PSS/SSS signal generator 326. The combined signal 328 is provided to the IFFT+CP block 330, is converted by the DAC 332 into the analog domain. The analog signal 336 is processed for radio transmission and eventually transmitted by the antenna 338. In accordance with embodiments, the inventive aspects, e.g., generating the SPS config message including the SPS interval defined on the TTI basis and/or including additional control data may be implemented using the mapper 318 for mapping the control data.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a field programmable gate array may cooperate with a microprocessor in order to perform one of the methods described herein. Generally, the methods are advantageously performed by any hardware apparatus.

Further embodiments are now described.

Embodiment 1 provides an apparatus for a wireless communication system,
wherein the apparatus is configured to perform semi-persistent scheduling (SPS),
wherein a size of an SPS interval is based on one or more transmission time intervals (TTIs),
wherein the apparatus is configured to receive and process a configuration message, the configuration message comprising one or more data fields indicative of the size of the SPS interval,
wherein the configuration message indicates a listening window at the beginning of an SPS interval, the listening window having predefined size shorter than the size of the SPS interval, and
wherein the apparatus is configured to listen for a control messages directed to the apparatus during the listening window.

Embodiment 2 provides the apparatus of embodiment 1, wherein the configuration message indicates a size of the listening window by an integer value indicative of a number of consecutive slots or symbols.

Embodiment 3 provides the apparatus of embodiment 1 or 2, configured to receive or transmit data using a data signal, the data signal comprising a plurality of frames, each frame comprising a plurality of subframes, and each subframe comprising a number of symbols in the time domain and a number of sub-carriers in the frequency domain, wherein the transmission time interval is defined by a predefined number of symbols in the time domain.

Embodiment 4 provides the apparatus of embodiment 3, wherein the transmission time interval is less than one subframe.

Embodiment 5 provides the apparatus of any one of embodiments 1 to 4, wherein the configuration message directly signals the size of the SPS interval using a value indicating a number of transmission time intervals defining the size of the SPS interval.

Embodiment 6 provides the apparatus of any one of embodiments 1 to 5, wherein
the configuration message indirectly signals the size of the SPS interval using one or more codewords, each codeword representing a certain size of the SPS interval,
the apparatus comprises a storage configured to store a plurality of entries, each entry holding a number of transmission time intervals defining the size of the SPS interval, and
the apparatus is configured to access the storage using the codeword, and to acquire the size of the SPS interval from the storage.

Embodiment 7 provides the apparatus of embodiment 6, wherein a length of the codeword depends on the frequency of occurrence of the encoded size of the SPS interval.

Embodiment 8 provides the apparatus of any one of embodiments 1 to 7, wherein the apparatus is configured to stop listening for the control messages prior to an end of the listening window, responsive to a control message during the listening window explicitly indicating a deactivation of an allocation of resources of the communication wireless communication system for the semi-persistent scheduling;
indicating a change of a configuration of the semi-persistent scheduling; and/or
indicating a spectrotemporal position of resources of the wireless communication system for the semi-persistent scheduling for a current SPS interval, with stopping listening for further control messages after having received the resources for the semi-persistent scheduling for the current SPS interval.

Embodiment 9 provides the apparatus of any one of embodiments 1 to 8, wherein the listening window starts one or more transmission time intervals prior to the beginning of an SPS interval and ends at least one transmission time interval after the beginning of the SPS interval.

Embodiment 10 provides the apparatus of embodiment 8, wherein the apparatus is configured to access the resource for the semi-persistent scheduling for a current interval from a resource block within a last transmission time interval within the listening window, coinciding in intra-TTI position with a default position, depending on whether one or more of the following conditions being fulfilled:
the apparatus has not yet stopped listening for the control messages,
the apparatus does not have already accessed the resource for the semi-persistent scheduling for the current interval from a resource block of a transmission time interval preceding the last transmission time interval of the listening window; and
there is no control message within a control channel of the last transmission time interval which indicates a position of the resource block within the last transmission time interval.

Embodiment 11 provides the apparatus of any one of embodiments 1 to 10, wherein the apparatus is configured to listen for the control messages within a physical downlink control channel.

Embodiment 12 provides the apparatus of any one of embodiments 1 to 11, wherein
the configuration message comprises control data for controlling an operation of the apparatus, and
the apparatus is configured to retrieve the control data from the configuration message and to cause an operation in accordance with the control data.

Embodiment 13 provides the apparatus of embodiment 12, wherein the control data comprises one or more of:
control data activating, releasing or indicating a duration of the semi-persistent scheduling,
control data indicating resources to be allocated for the semi-persistent scheduling per SPS interval,
control data indicating transmission parameters for the semi-persistent scheduling,
control data indicating frequency hopping information, and
control data indicating one or more certain downlink payload data messages triggering a direct or delayed uplink message.

Embodiment 14 provides the apparatus of embodiment 13, wherein the frequency hopping information indicates a temporal hopping basis out of different bases comprising a OFDM symbol basis or a below-slot basis.

Embodiment 15 provides the apparatus of any one of embodiments 1 to 14, wherein the configuration message is comprised by a payload section of resources of the wireless communication system allocated via the semi-persistent scheduling or in a non-semi-persistent manner.

Embodiment 16 provides the apparatus of any one of embodiments 1 to 16, wherein the configuration message is a first configuration message, with the size of the SPS interval being valid
- until changed by a second configuration message, and/or
- until reaching an end of a time to live for the semi-persistent scheduling defined by the first configuration message, and/or
- until changed by a control message from a higher order protocol.

Embodiment 17 provides the apparatus of any one of embodiments 1 to 16, wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

Embodiment 18 provides an apparatus for a wireless communication system,
- wherein the apparatus is configured to perform semi-persistent scheduling (SPS),
- wherein a size of an SPS interval is based on one or more transmission time intervals (TTIs),
- wherein the apparatus is configured to receive and process a configuration message, the configuration message comprising one or more data fields indicative of the size of the SPS interval, and
- wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

Embodiment 19 provides the apparatus of embodiment 18, wherein the control message is a DCI, and wherein the configuration message indicates several SPS configurations, the several SPS configurations being referenced by the DCI using a common SPS RNTI, the DCI comprising a SPS configuration index to discriminate between the several SPS configurations, the DCI causing a selective activation and deactivation of one of more of the several SPS configurations.

Embodiment 20 provides the apparatus of any one of embodiments 1 to 19, configured to deactivate, activate or reconfigure the semi-persistent scheduling (SPS) responsive to an event detectable for the apparatus and a further apparatus of the wireless communication system from which the apparatus receives, or to which the apparatus transmits, payload data via resources of the semi-persistent scheduling.

Embodiment 21 provides the apparatus of any one of embodiments 1 to 20, wherein the apparatus is a mobile terminal transmitting data within resources allocated by the semi-persistent scheduling, wherein the apparatus is configured to, responsive to a NACK message, look in a control message succeeding the NACK message for an hint on a transmission failure and information concerning a reconfiguration of the semi-persistent scheduling.

Embodiment 22 provides the apparatus of embodiment 21, wherein the apparatus is configured such that the semi-persistent scheduling is reconfigured by way of configuration messages comprised by a payload section of resources of the wireless communication system allocated via the semi-persistent scheduling or in a non-semi-persistent manner.

Embodiment 23 provides the apparatus of embodiment 21, wherein the apparatus is configured such that the semi-persistent scheduling is reconfigurable, in addition to control messages found responsive to any NACK message, by way of configuration messages comprised by a payload section of resources of the wireless communication system allocated via the semi-persistent scheduling or in a non-semi-persistent manner exclusively.

Embodiment 24 provides the apparatus of any one of embodiments 1 to 23, wherein the apparatus is configured to generate and transmit a configuration message, the configuration message comprising one or more data fields indicative of the size of the SPS interval, wherein
- the apparatus is configured to indirectly signal in the configuration message the size of the SPS interval using one or more codewords, with selecting the codeword one or more depending on
- a wanted size of the SPS interval;
- whether a mobile terminal to which the semi-persistent scheduling is dedicated, and for which the wanted size of an SPS interval is to be indicated by the one or more codewords is of a first type or a second type, with selecting the one or more codewords, if the mobile terminal is of the second type, additional depending on a currently set length of the transmission time interval,
- wherein the wanted size measures the SPS interval in units of transmission time intervals in case of the mobile terminal being of the second type and the wanted size measures the SPS interval in units of subframes in case of the mobile terminal being of the first type.

Embodiment 25 provides the apparatus of embodiment 24, wherein the codewords are variable length codewords.

Embodiment 26 provides an apparatus for a wireless communication system,
- wherein the apparatus is configured to perform semi-persistent scheduling,
- wherein the apparatus is configured such that the semi-persistent scheduling is controlled via a configuration message, and
- wherein the configuration message comprises one or more of:
- control data activating, releasing or indicating a duration of the semi-persistent scheduling,
- control data indicating resources to be allocated for the semi-persistent scheduling,
- control data indicating transmission parameters for the semi-persistent scheduling,
- control data indicating frequency hopping information,
- control data indicating one or more certain downlink payload data messages triggering a direct or delayed uplink message,
- control data indicating several SPS intervals or SPS configuration modes among which one or more may be activated or deactivated by further configuration messages or control messages subsequent to the configuration message,
- control data indicating a listening window at the beginning of a SPS interval, the listening window having predefined size shorter than the size of the SPS interval and allowing for control messages during the listening window to be listened.

Embodiment 27 provides the apparatus of embodiment 26, wherein the configuration message is a SPS configuration message to be provided by RRC and indicating
an activation and a duration of the semi-persistent scheduling, and
a delay of the activation, and
the resources to be allocated for the semi-persistent scheduling, and
the MCS for the semi-persistent scheduling, and
that frequency hopping is enabled and the hopping pattern.

Embodiment 28 provides the apparatus of embodiment 26 or 27, wherein the configuration message is a SPS configuration message provided by RRC.

Embodiment 29 provides the apparatus of any one of embodiments 26 to 28, wherein the configuration message is comprised by payload sections of resources of the wireless communication system allocated to a mobile terminal via the semi-persistent scheduling or in a non-semi-persistent manner, wherein the apparatus is the mobile terminal or a further apparatus of the wireless communication system from which the apparatus receives, or to which the apparatus transmits, payload data via resources of the semi-persistent scheduling.

Embodiment 30 provides the apparatus of any one of embodiments 26 to 29, wherein the configuration message is a first configuration message, with a configuration of the SPS defined in the first configuration message being valid
until changed by a second configuration message, and/or
until reaching an end of a time to live for the semi-persistent scheduling defined by the first configuration message, and/or
until changed by a control message from a higher order protocol.

Embodiment 31 provides the apparatus of any one of embodiments 26 to 30, wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

Embodiment 32 provides the apparatus of any one of embodiments 26 to 31, configured to deactivate the semi-persistent scheduling (SPS) responsive to an event detectable for the apparatus and a further apparatus of the wireless communication system from which the apparatus receives, or to which the apparatus transmits, payload data via resources of the semi-persistent scheduling.

Embodiment 33 provides the apparatus of embodiment 16, 17 or 24, wherein the further configuration messages or control messages are scrambled by the same RNTI and differentiated by an SPS configuration index.

Embodiment 34 provides the apparatus of any one of embodiments 1 to 33, wherein the apparatus is a receiver, such as a mobile terminal, configured to receive and process a configuration message from a transmitter, such as a base station, to perform the semi-persistent scheduling or the apparatus is a transmitter, such as a base station, configured to transmit to a receiver, such as a mobile terminal, a configuration message to configure the receiver to perform semi-persistent scheduling in a manner coinciding with the apparatus' semi-persistent scheduling.

Embodiment 35 provides the apparatus of any one of embodiments 1 to 34, wherein the apparatus is configured to transmit payload data via allocated resources in units of transmission time intervals by scrambling and/or interleaving the payload data along with FEC data protecting the payload data before mapping the payload data onto the allocated resources, and/or receive payload data via allocated resources in units of transmission time intervals by descrambling and/or deinterleaving the payload data along with FEC data protecting the payload data upon demapping the payload data from the allocated resources.

Embodiment 36 provides an apparatus for a wireless communication system,
wherein the apparatus is configured to perform semi-persistent scheduling (SPS) for resources of first payload data transmissions in an SPS direction being a downlink or uplink direction,
wherein the apparatus is configured so that SPS times at which the resources for the first payload data transmissions are scheduled, are triggered by second payload data transmissions in an opposite direction being opposite to the SPS direction.

Embodiment 37 provides the apparatus of embodiment 36, wherein the apparatus is configured to perform semi-persistent scheduling, SPS, in the uplink, UL, direction, wherein the first payload data transmissions comprise hybrid automatic repeat request, HARQ, retransmissions, and wherein the apparatus is configured so that SPS times at which the resources for the HARQ, retransmissions are scheduled, are triggered by a SPS downlink, DL, message.

Embodiment 38 provides the apparatus of embodiment 36, configured to schedule the SPS times relative to the second payload data transmissions in a manner defined by a configuration message in a downlink configuration message.

Embodiment 39 provides the apparatus of embodiment 38, wherein the configuration message defines the scheduling of the SPS times relative to the second payload data transmissions in terms of
a discrimination between second payload data transmissions triggering an SPS time and second payload data transmissions not triggering an SPS time; and
a delay between the second payload data transmissions and the SPS times triggered thereby.

Embodiment 40 provides the apparatus of embodiment 38 or 39, wherein
the configuration message indicates a listening window at each SPS time,
the apparatus is configured to listen for a control message directed to the apparatus during the listening window, Embodiment 41 provides the apparatus of embodiment 40, wherein the apparatus is configured to stop listening for the control message prior to an end of the listening window, responsive to a control message during the listening window
explicitly indicating a deactivation of an allocation of the resources of the first payload data transmissions via the semi-persistent scheduling;
indicating a change of a configuration of the semi-persistent scheduling; and/or
indicating a spectrotemporal position of resources of the wireless communication system for the semi-persistent scheduling for a current SPS time, with stopping listening for further control messages after having received the resources for the semi-persistent scheduling for the current SPS time.

Embodiment 42 provides the apparatus of embodiment 40 or 41, wherein the listening window starts one or more transmission time intervals prior to the beginning of an SPS time and ends at least one transmission time interval after the beginning of the SPS time.

Embodiment 43 provides the apparatus of embodiment 42, wherein the apparatus is configured to access the resource for the semi-persistent scheduling for a current SPS time from a resource block within a last transmission time interval within the listening window, coinciding in intra-TTI position with a default position, depending on whether one or more of the following conditions being fulfilled:
- the apparatus has not yet stopped listening for the control messages,
- the apparatus does not have already accessed the resource for the semi-persistent scheduling for the current SPS time from a resource block of a transmission time interval preceding the last transmission time interval of the listening window; and
- there is no control message within a control channel of the last transmission time interval which indicates a position of the resource block within the last transmission time interval.

Embodiment 44 provides the apparatus of any one of embodiments 40 to 43, wherein the apparatus is configured to listen for the control messages within a physical downlink control channel.

Embodiment 45 provides the apparatus of any one of embodiments 36 to 44, wherein the configuration message is comprised by a payload section of resources of downlink transmissions.

Embodiment 46 provides the apparatus of any one of embodiments 36 to 45, wherein the apparatus is a receiver, such as a mobile terminal, configured to receive and process a configuration message from a transmitter, such as a base station, configuring the semi-persistent scheduling or the apparatus is a transmitter, such as a base station, configured to transmit to a receiver, such as a mobile terminal, a configuration message to configure the receiver to configure semi-persistent scheduling in a manner coinciding with the apparatus' semi-persistent scheduling.

Embodiment 47 provides an apparatus for a wireless communication system,
- wherein the apparatus is configured to perform semi-persistent scheduling (SPS),
- wherein the apparatus is configured so that a configuration mode of the SPS is changed, or SPS is established, triggered by
- a first entity communicating with another entity via payload data transmitted over the wireless communication system, or
- a message indicating an event which depends on physical environmental conditions of the apparatus.

Embodiment 48 provides the apparatus of embodiment 47, wherein the apparatus is configured to change the configuration mode of, or establish, the SPS in terms of
- SPS interval,
- SPS bitrate,
- coding and modulation used for SPS resources.

Embodiment 49 provides the apparatus of embodiment 47 or 48, wherein the apparatus is configured to change the configuration of, or establish, the SPS responsive to one or more of the following
- a message from the first entity informing the apparatus on a TCP slow start;
- a message from the first entity informing the apparatus on TCP congestion avoidance;
- a message from the first entity informing the apparatus on a change in a bitrate version bitrate-adaptively streamed between the first and second entities;
- a hint on an improvement or worsening of transmission conditions along SPS direction;
- a change in resolution, quality or coding complexity of video or picture data transmitted over the wireless communication system using the SPS,
- targeted packet error rate;
- speech to pause/silence transition.

Embodiment 50 provides the apparatus of any one of embodiments 47 to 49, wherein the apparatus is a receiver, such as a mobile terminal or UE, configured to initiate, for example, the change of the configuration of the SPS or establishment the SPS by a SPS request requesting the a transmitter such as a base station to install the SPS and, optionally, confirm the SPS configuration change or establishment by issuing a corresponding SPS configuration message, or the apparatus is a transmitter, such as a base station, configured to issue to a receiver, such as a mobile terminal, a corresponding SPS configuration message for a change in configuration or establishment of SPS Embodiment 51 provides a wireless communication system, comprising an apparatus according to any one of embodiments 1 to 49.

Embodiment 52 provides a method, comprising:
- performing semi-persistent scheduling so as to receive or transmit data in a wireless communication system,
- wherein a size of an SPA interval is based on one or more transmission time intervals,
- wherein the method comprises receiving and processing a configuration message, the configuration message comprising one or more data fields indicative of the size of the SPS interval,
- wherein the configuration message indicates a listening window at the beginning of an SPS interval, the listening window having predefined size shorter than the size of the SPS interval, and
- wherein the method comprises listening for a control messages directed to an apparatus of the wireless communication system during the listening window.

Embodiment 53 provides a method, comprising:
- performing semi-persistent scheduling so as to receive or transmit data in a wireless communication system,
- controlling the semi-persistent scheduling via a configuration message, and
- wherein the configuration message comprises one or more of:
- control data activating, releasing or indicating a duration of the semi-persistent scheduling,
- control data indicating resources to be allocated for the semi-persistent scheduling,
- control data indicating transmission parameters for the semi-persistent scheduling,
- control data indicating frequency hopping information,
- control data indicating one or more certain downlink payload data messages triggering a direct or delayed uplink message,
- control data indicating several SPS intervals or SPS configuration modes among which one or more may be activated or deactivated by further configuration messages or control messages subsequent to the configuration message,
- control data indicating a listening window at the beginning of a SPS interval, the listening window having predefined size shorter than the size of the SPS interval and allowing for control messages during the listening window to be listened.

Embodiment 54 provides a method, comprising:
- performing semi-persistent scheduling so as to receive or transmit data in a wireless communication system, wherein a size of an SPA interval is based on one or more transmission time intervals, wherein the method comprises receiving and processing a configuration message, the configuration message comprising one or more data fields indicative of the size of the SPS interval, and wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

Embodiment 55 provides the method of any one of embodiments 52 to 53, wherein the method is performed by a transmitter or a base station of the wireless communication system.

Embodiment 56 provides a method comprising performing semi-persistent scheduling (SPS) for resources of first payload data transmissions in a wireless communication system in an SPS direction being a downlink or uplink direction, triggering SPS times at which the resources for the first payload data transmissions are scheduled, by second payload data transmissions in an opposite direction being opposite to the SPS direction.

Embodiment 57 provides a method comprising performing semi-persistent scheduling (SPS) in a wireless communication system, changing a configuration of the SPS is changed, or establishing the SPS, triggered by a first entity communicating with another entity via payload data transmitted over the wireless communication system, or a message indicating an event which depends on physical environmental conditions.

Embodiment 58 provides a non-transitory digital storage medium having a computer program stored thereon to perform the method, comprising:

performing semi-persistent scheduling so as to receive or transmit data in a wireless communication system, wherein a size of an SPA interval is based on one or more transmission time intervals, wherein the method comprises receiving and processing a configuration message, the configuration message comprising one or more data fields indicative of the size of the SPS interval, wherein the configuration message indicates a listening window at the beginning of an SPS interval, the listening window having predefined size shorter than the size of the SPS interval, and wherein the method comprises listening for a control messages directed to an apparatus of the wireless communication system during the listening window, when said computer program is run by a computer.

Embodiment 59 provides a non-transitory digital storage medium having a computer program stored thereon to perform the method, comprising:

performing semi-persistent scheduling so as to receive or transmit data in a wireless communication system, controlling the semi-persistent scheduling via a configuration message, and wherein the configuration message comprises one or more of:

control data activating, releasing or indicating a duration of the semi-persistent scheduling, control data indicating resources to be allocated for the semi-persistent scheduling, control data indicating transmission parameters for the semi-persistent scheduling, control data indicating frequency hopping information, control data indicating one or more certain downlink payload data messages triggering a direct or delayed uplink message, control data indicating several SPS intervals or SPS configuration modes among which one or more may be activated or deactivated by further configuration messages or control messages subsequent to the configuration message, control data indicating a listening window at the beginning of a SPS interval, the listening window having predefined size shorter than the size of the SPS interval and allowing for control messages during the listening window to be listened, when said computer program is run by a computer.

Embodiment 60 A non-transitory digital storage medium having a computer program stored thereon to perform the method, comprising:

performing semi-persistent scheduling so as to receive or transmit data in a wireless communication system, wherein a size of an SPA interval is based on one or more transmission time intervals, wherein the method comprises receiving and processing a configuration message, the configuration message comprising one or more data fields indicative of the size of the SPS interval, and wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message, when said computer program is run by a computer.

Embodiment 61 provides a non-transitory digital storage medium having a computer program stored thereon to perform the method comprising performing semi-persistent scheduling (SPS) for resources of first payload data transmissions in a wireless communication system in an SPS direction being a downlink or uplink direction, triggering SPS times at which the resources for the first payload data transmissions are scheduled, by second payload data transmissions in an opposite direction being opposite to the SPS direction, when said computer program is run by a computer.

Embodiment 62 provides a non-transitory digital storage medium having a computer program stored thereon to perform the method comprising performing semi-persistent scheduling (SPS) in a wireless communication system, changing a configuration of the SPS is changed, or establishing the SPS, triggered by a first entity communicating with another entity via payload data transmitted over the wireless communication system, or a message indicating an event which depends on physical environmental conditions, when said computer program is run by a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] C. Johnson: Long Term Evolution in Bullets, 2nd edition, 2012, p. 462
[2] 3GPP TS 36.321 V13.1.0 (2016 March), p. 42ff
[3] 3GPP TS 36.213 V13.1.1 (2016 March), Section 9.2
[4] http://howltestuffworks.blogspot.de/2013/10/semi-persistent-scheduling.html
[5] 3GPP TS 36.331 V13.1.0 (2016 March), p. 354
[6] 3GPP TR36.881 V0.6.0 (2016 February), "Study on latency reduction techniques for LTE"
[7] R1-165571, Ericsson, Intel, Nokia, Alcatel-Lucent Shanghai Bell, "Way forward on scheduling mechanism for sTTI"
[8] 3GPP TS 36.211 V13.1.0 (2016 March), Section 5.3.4
[9] 3GPP TS 36.213 V13.1.1 (2016 March), Section 8.4
[10] 3GPP TS 36.211 V13.1.0 (2016 March), Section 6.4.1
[11] R1-162588, Huawei, HiSilicon, "DCI design for short TTI"
[12] R1-164060, Huawei, HiSllicon, "DCI design for short TTI"

The invention claimed is:

1. An apparatus for a wireless communication system, wherein the apparatus is configured to perform semi-persistent scheduling (SPS),
wherein a size of an SPS interval is based on one or more transmission time intervals (TTIs),
wherein the apparatus is configured to receive and process a configuration message, the configuration message comprising one or more data fields indicative of the size of the SPS interval,
wherein the configuration message indirectly signals the size of the SPS interval using one or more codewords, each codeword representing a certain size of the SPS interval,
wherein the apparatus comprises a storage configured to store a plurality of entries, each entry holding a number of transmission time intervals defining the size of the SPS interval, and
wherein the apparatus is configured to access the storage using the codeword, and to acquire the size of the SPS interval from the storage.

2. The apparatus of claim 1, wherein
the configuration message indicates a listening window at the beginning of an SPS interval, the listening window having predefined size shorter than the size of the SPS interval, and
the apparatus is configured to listen for a control messages directed to the apparatus during the listening window,
the configuration message indicates a size of the listening window by an integer value indicative of a number of consecutive slots or symbols.

3. The apparatus of claim 1, configured to receive or transmit data using a data signal, the data signal comprising a plurality of frames, each frame comprising a plurality of subframes, and each subframe comprising a number of symbols in the time domain and a number of sub-carriers in the frequency domain,
wherein the transmission time interval is defined by a predefined number of symbols in the time domain.

4. The apparatus of claim 3, wherein the transmission time interval is less than one subframe.

5. The apparatus of claim 1, wherein the configuration message directly signals the size of the SPS interval using a value indicating a number of transmission time intervals defining the size of the SPS interval.

6. The apparatus of claim 1, wherein a length of the codeword depends on the frequency of occurrence of the encoded size of the SPS interval.

7. The apparatus of claim 2, wherein the apparatus is configured to stop listening for the control messages prior to an end of the listening window, responsive to a control message during the listening window
explicitly indicating a deactivation of an allocation of resources of the communication wireless communication system for the semi-persistent scheduling; and/or
indicating a change of a configuration of the semi-persistent scheduling; and/or
indicating a spectrotemporal position of resources of the wireless communication system for the semi-persistent scheduling for a current SPS interval, with stopping listening for further control messages after having received the resources for the semi-persistent scheduling for the current SPS interval.

8. The apparatus of claim 2, wherein the listening window starts one or more transmission time intervals prior to the beginning of an SPS interval and ends at least one transmission time interval after the beginning of the SPS interval.

9. The apparatus of claim 8, wherein the apparatus is configured to access the resource for the semi-persistent scheduling for a current interval from a resource block within a last transmission time interval within the listening window, coinciding in intra-TTI position with a default position, depending on whether one or more of the following conditions being fulfilled:
the apparatus has not yet stopped listening for the control messages,
the apparatus does not have already accessed the resource for the semi-persistent scheduling for the current interval from a resource block of a transmission time interval preceding the last transmission time interval of the listening window; and
there is no control message within a control channel of the last transmission time interval which indicates a position of the resource block within the last transmission time interval.

10. The apparatus of claim 1, wherein the apparatus is configured to listen for the control messages within a physical downlink control channel.

11. The apparatus of claim 1, wherein
the configuration message comprises control data for controlling an operation of the apparatus, and
the apparatus is configured to retrieve the control data from the configuration message and to cause an operation in accordance with the control data.

12. The apparatus of claim 11, wherein the control data comprises one or more of:
control data activating, releasing or indicating a duration of the semi-persistent scheduling,
control data indicating resources to be allocated for the semi-persistent scheduling per SPS interval, control data indicating transmission parameters for the semi-persistent scheduling, control data indicating frequency hopping information, and control data indicating one or more certain downlink payload data messages triggering a direct or delayed uplink message.

13. The apparatus of claim 12, wherein the frequency hopping information indicates a temporal hopping basis out of different bases comprising a OFDM symbol basis or a below-slot basis.

14. The apparatus of claim 1, wherein the configuration message is comprised by a payload section of resources of the wireless communication system allocated via the semi-persistent scheduling or in a non-semi-persistent manner.

15. The apparatus of claim 1, wherein the configuration message is a first configuration message, with the size of the SPS interval being valid until changed by a second configuration message, and/or until reaching an end of a time to live for the semi-persistent scheduling defined by the first configuration message, and/or until changed by a control message from a higher order protocol.

16. The apparatus of claim 1, wherein the configuration message indicates several SPS intervals or SPS configuration modes and the apparatus is configured to switch between the several SPS intervals or SPS configuration modes, or selectively activate and deactivate one or more of the SPS intervals or SPS configuration modes, subsequent to the configuration message responsive to further configuration messages or control messages subsequent to the configuration message.

17. A wireless communication system, comprising an apparatus according to claim 1.

18. A method, comprising:

performing semi-persistent scheduling so as to receive or transmit data in a wireless communication system, wherein a size of an SPS interval is based on one or more transmission time intervals, wherein the method comprises receiving and processing a configuration message, the configuration message comprising one or more data fields indicative of the size of the SPS interval, wherein the configuration message indirectly signals the size of the SPS interval using one or more codewords, each codeword representing a certain size of the SPS interval, wherein the method comprises storing, in a storage, a plurality of entries, each entry holding a number of transmission time intervals defining the size of the SPS interval, and wherein the method comprises accessing the storage using the codeword, and to acquire the size of the SPS interval from the storage.

19. The method of claim 18, wherein the method is performed by a transmitter or a base station of the wireless communication system.

20. A non-transitory digital storage medium having a computer program stored thereon to perform the method, comprising:

performing semi-persistent scheduling so as to receive or transmit data in a wireless communication system, wherein a size of an SPS interval is based on one or more transmission time intervals, wherein the method comprises receiving and processing a configuration message, the configuration message comprising one or more data fields indicative of the size of the SPS interval, wherein the configuration message indirectly signals the size of the SPS interval using one or more codewords, each codeword representing a certain size of the SPS interval, wherein the method comprises storing, in a storage, a plurality of entries, each entry holding a number of transmission time intervals defining the size of the SPS interval, and wherein the method comprises accessing the storage using the codeword, and to acquire the size of the SPS interval from the storage, when said computer program is run by a computer.

* * * * *